United States Patent
Mukaiyama et al.

(10) Patent No.: US 8,086,613 B2
(45) Date of Patent: Dec. 27, 2011

(54) REPRODUCING APPARATUS, REPRODUCING METHOD, AND REPRODUCING PROGRAM

(75) Inventors: Ryo Mukaiyama, Tokyo (JP); Susumu Ijichi, Kanagawa (JP); Satoshi Araki, Kanagawa (JP)

(73) Assignee: Sony Corporation, Tokyo (JP)

( * ) Notice: Subject to any disclaimer, the term of this patent is extended or adjusted under 35 U.S.C. 154(b) by 563 days.

(21) Appl. No.: 11/852,586

(22) Filed: Sep. 10, 2007

(65) Prior Publication Data

US 2008/0074985 A1    Mar. 27, 2008

(30) Foreign Application Priority Data

Sep. 21, 2006    (JP) .................................. 2006-256500

(51) Int. Cl.
*G06F 7/04*  (2006.01)
*G06F 17/30*  (2006.01)
(52) U.S. Cl. .................... 707/752; 707/758; 707/769
(58) Field of Classification Search ....... 707/3, 999.003, 707/769, 752, 758
See application file for complete search history.

(56) References Cited

U.S. PATENT DOCUMENTS

| 6,526,411 B1 * | 2/2003 | Ward .................................... 1/1 |
| 7,590,656 B2 * | 9/2009 | Plastina et al. ........................ 1/1 |
| 2007/0038612 A1 * | 2/2007 | Sull et al. .......................... 707/3 |
| 2009/0158155 A1 * | 6/2009 | Quinn et al. .................. 715/716 |

FOREIGN PATENT DOCUMENTS

| JP | 2003-162285 | 6/2003 |
| JP | 2003271630 A * | 9/2003 |
| JP | 2005-11457 | 1/2005 |
| JP | 2005-116068 | 4/2005 |
| JP | 2005-284574 | 10/2005 |

OTHER PUBLICATIONS

U.S. Appl. No. 12/841,753, filed Jul. 22, 2010, Ijichi.

* cited by examiner

*Primary Examiner* — James Trujillo
*Assistant Examiner* — Bruce Moser
(74) *Attorney, Agent, or Firm* — Oblon, Spivak, McClelland, Maier & Neustadt, L.L.P.

(57) ABSTRACT

Disclosed herein is a reproducing apparatus including, a content storage block configured to store content and attribute information thereof by relating with each other, an input block configured to enter a command, a reproducing block configured to reproduce content, and a control block configured to control the reproducing block such that, when a content switching command is entered from the input block during reproduction of a first piece of content by the reproducing block, the first piece of content is switched to another piece of content that belongs to related list information to which at least one piece of content related with the first piece of content belongs, the another piece of content having been generated on the basis of attribute information of the first piece of content, and then the another piece of content is reproduced.

28 Claims, 17 Drawing Sheets

Ti

| ID | *******1 | *******5 | ... |
|---|---|---|---|
| TITLE | WALK THIS STREET | DESTINY | ... |
| ARTIST | AROESMITH | BOOTHOVEN | ... |
| ALBUM | THE GREATEST HITS | JALAPENO BAND | ... |
| GENRE | ROCK | CLASSICAL | ... |
| RELEASED | 2004 | 2002 | ... |
| RECORDED | 2005/01/15 19:31:11 | 2003/05/03 13:40:03 | ... |
| PLAY TIME | 04:35 | 06:05 | ... |
| PLAY COUNT | 13 | 5 | ... |
| JACKET IMAGE | ***.* | ***.* | ... |
| CHARACTERISTICS TEMPO | 120 | 110 | ... |
| CHARACTERISTICS VOCAL | 150 | 30 | ... |
| CHARACTERISTICS MOOD | HAPPY | SAD | ... |
| CLUSTER NO. | 0082 | 0078 | ... |

REPRODUCING APPARATUS, REPRODUCING METHOD, AND REPRODUCING PROGRAM

CROSS REFERENCES TO RELATED APPLICATIONS

The present invention contains subject matter related to Japanese Patent Application JP 2006-256500 filed in the Japan Patent Office on Sep. 21, 2006, the entire contents of which being incorporated herein by reference.

BACKGROUND OF THE INVENTION

The present invention relates to a reproducing apparatus, a reproducing method, and a reproducing program that are suitable for reproducing content.

Recently, reproducing apparatus are in a wide use in which content (audio data for example) is read from a hard disk for example to be reproduced or audio data is downloaded from a server to be reproduced. The reproducing apparatuses of this type can not only reproduce any specified audio data but also and consecutively reproduce audio data registered in a play list in a sequence specified in the play list.

The reproducing apparatus of this type includes a proposed apparatus in which a play list corresponding to a condition such as user's preference information is prepared and, on the basis of this condition, audio data is automatically registered in the corresponding play list (refer, for example, to Japanese Patent Laid-open 2003-162285 as Patent document 1).

SUMMARY OF THE INVENTION

However, while the above-mentioned related-art reproducing apparatuses can let a user hear music (namely, music tracks) matching user preference by reproducing audio data registered in a play list (thereafter also referred to as a preference list) corresponding to user preference information, these apparatuses present a problem of requiring the user to execute a complicated operation when the user wants to hear tracks of the audio data registered in another play list related with the audio data registered in this preference list, for example.

To be more specific, if the user wants to hear a track of a same artist as a track of given audio data registered in a preference list, this track of the audio data being registered in a play list separate from this preference list, each related-art reproducing apparatus requires the user to execute at least an operation of searching the audio data corresponding to a track of a same artist as a track of given audio data registered in the preference list and an operation of specifying the audio data corresponding to a track of the same artist registered in another play list to reproduce the track.

Therefore, if the above-mentioned complicated operations can be simplified, the convenience at the time of content reproduction may be significantly enhanced as compared with the related-art technologies.

The present invention addresses the above-identified and other problems associated with related-art methods and apparatuses and solves the addressed problems by providing a reproducing apparatus, a reproducing method, and a reproducing program that are configured to significantly enhance the convenience at the time of content reproduction as compared with the related-art technologies.

In carrying out the invention and according to one embodiment thereof, there is provided a reproducing apparatus. This reproducing apparatus is made up of: a content storage block configured to store content and attribute information thereof by relating with each other; an input block configured to enter a command; a reproducing block configured to reproduce content; and a control block configured to control the reproducing block such that, when a content switching command is entered from the input block during reproduction of a first piece of content by the reproducing block, the first piece of content is switched to another piece of content that belongs to related list information to which at least one piece of content related with the first piece of content belongs, the another piece of content having been generated on the basis of attribute information of the first piece of content, and then the another piece of content is reproduced.

In carrying out the invention and according to another embodiment thereof, there is provided a reproducing method made up the steps of, reproducing a piece of content, and switching, when a content switching command is entered during reproduction of a first piece of content in the reproduction step, to a piece of content belonging to related list information to which at least one piece of content related with the first piece of content belongs, the one piece of content having been generated on the basis of attribute information of the first piece of content, and reproducing the switched piece of content.

In carrying out the invention and according to yet another embodiment thereof, there is provided a reproducing program configured to make a computer execute the steps of, reproducing a piece of content, and switching, when a content switching command is entered during reproduction of a first piece of content in the reproduction step, to a piece of content belonging to related list information to which at least one piece of content related with the first piece of content belongs, the one piece of content having been generated on the basis of attribute information of the first piece of content, and reproducing the switched piece of content.

The above-described novel configuration allows the switching of content reproduction from a first piece of content to another piece of content belonging to a play list to which pieces of content related with the first piece of content belong, only by making the user enter a content switching command.

As described and according to the invention, a reproducing apparatus has a content storage block configured to store content and attribute information thereof by relating with each other; an input block configured to enter a command; a reproducing block configured to reproduce content; and a control block configured to control the reproducing block such that, when a content switching command is entered from the input block during reproduction of a first piece of content by the reproducing block, the first piece of content is switched to another piece of content that belongs to related list information to which at least one piece of content related with the first piece of content belongs, the another piece of content having been generated on the basis of attribute information of the first piece of content, and then the another piece of content is reproduced. This novel configuration allows the switching of content reproduction from a first piece of content to another piece of content belonging to a play list to which pieces of content related with the first piece of content belong, only by making the user enter a content switching command. Consequently, the present invention realizes a reproducing apparatus, a reproducing method, and a reproducing program that are significantly enhanced in the convenience at the time of content reproduction as compared with related-art technologies.

BRIEF DESCRIPTION OF THE DRAWINGS

Other objects and embodiments of the invention will become apparent from the following description of embodiments with reference to the accompanying drawings in which.

DETAILED DESCRIPTION OF THE PREFERRED EMBODIMENTS

This invention will be described in further detail by way of embodiments thereof with reference to the accompanying drawings.

(1) Overview of a First Embodiment

The following describes an overview of a first embodiment of the invention, followed by the description of a specific example of the first embodiment.

Figure 1:
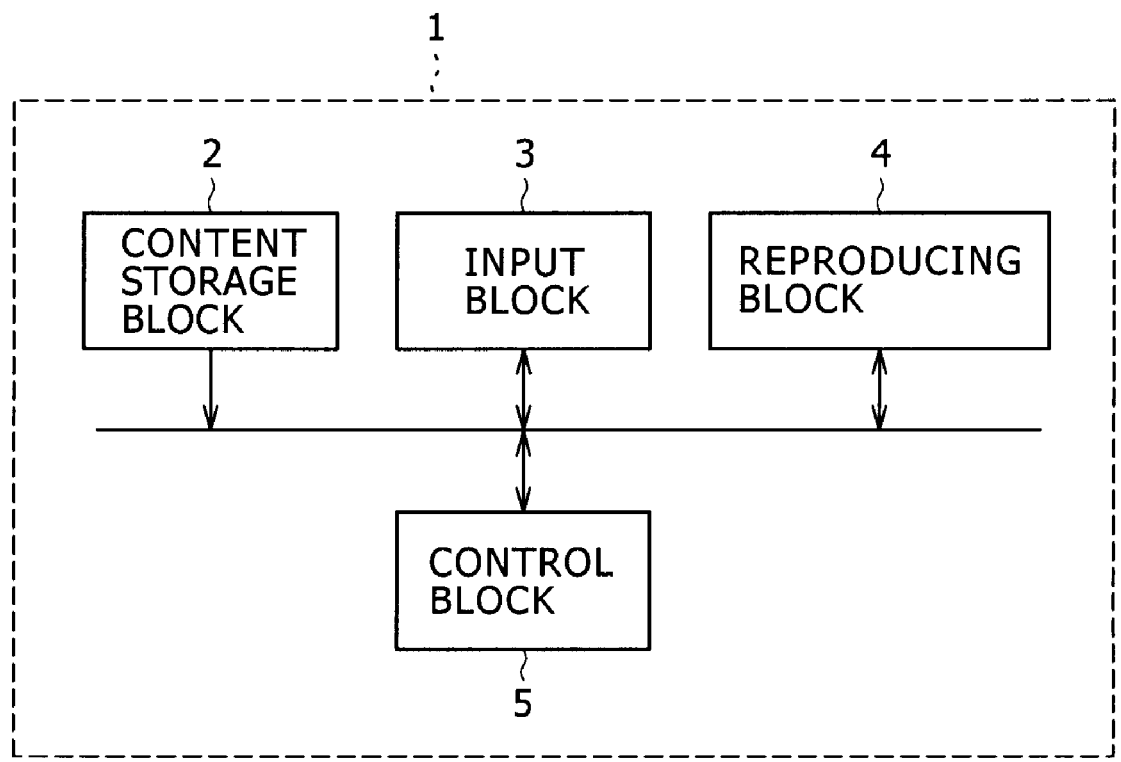
FIG. 1 is a block diagram illustrating a configuration of a reproducing apparatus outlining a first embodiment of the invention.

Now, referring to FIG. 1, there are shown functional blocks of reproducing apparatus 1 has a content storage block 2 configured to store content and attribute information thereof in a related manner, an input block 3 through which commands are entered, a reproducing block 4 configured to reproduce content, and a control block 5 configured to control the reproducing block 4 such that, when a content switching command is entered from the input block 3 during reproduction of a first piece of content by the reproducing block 4, the first content is switched to another piece of content that belongs to related list information to which one or more pieces of content related with the first content generated on the basis of attribute information of the first piece of content belong, thereby reproducing this switched another piece of content.

Thus configured, by only making the user execute an operation of entering a content switching command during reproduction of a given first piece of content, the reproducing apparatus 1 can switch the reproduction of content from the first piece of content to a piece of content belonging to a play list to which the pieces of content associated with the first piece of content belong. This configuration can significantly enhance the convenience at the time of content reproduction as compared with related-art technologies.

(2) Example of the First Embodiment

(2-1) Configuration and Basic Functions of a Music Reproducing Apparatus

Figure 2:
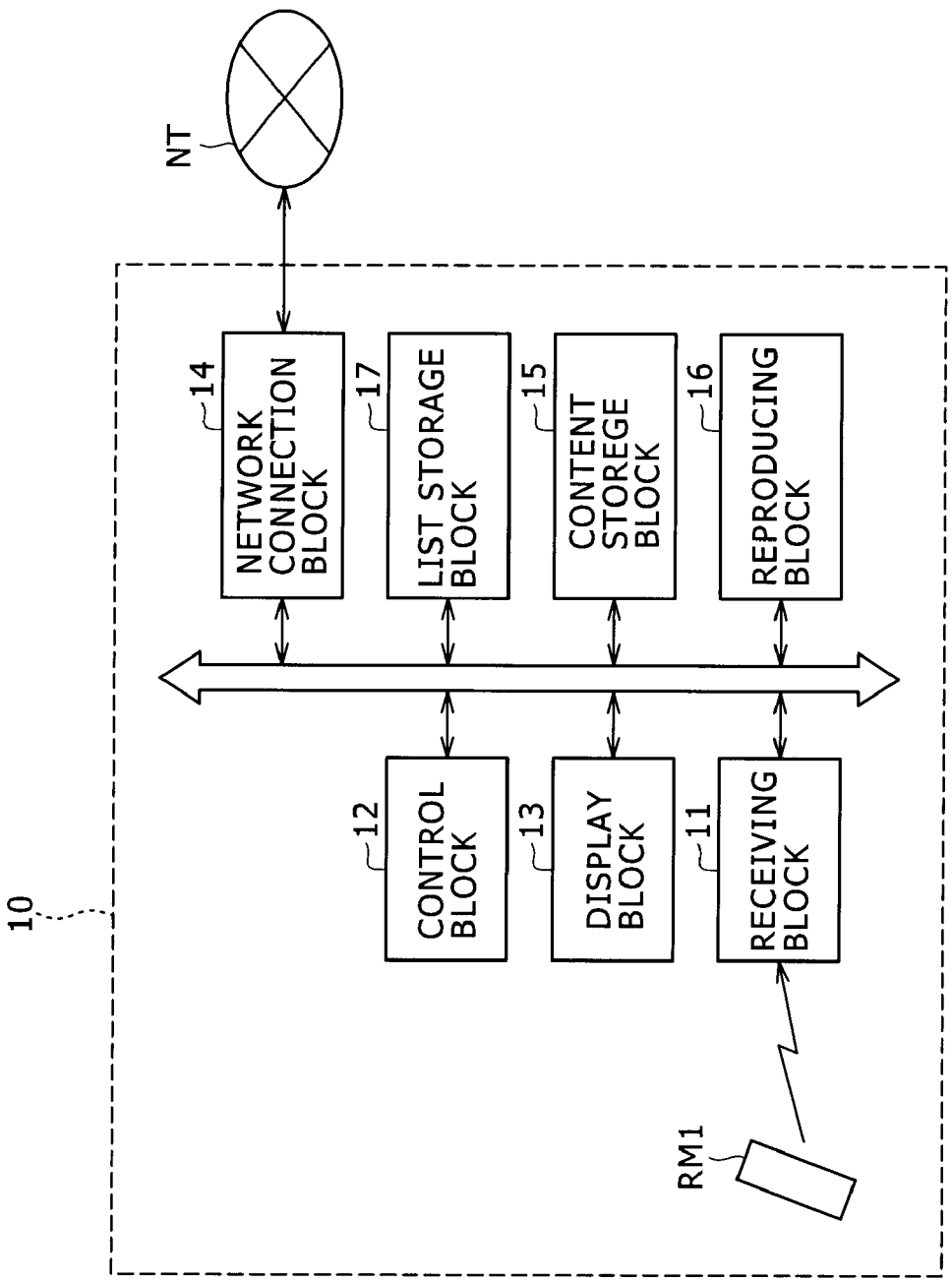
FIG. 2 is a block diagram illustrating a configuration of a music reproducing apparatus providing a specific example of the first embodiment.

The following describes a specific example of the present embodiment. A music reproducing apparatus 10 shown in FIG. 2 is one specific example of the reproducing apparatus 1 shown in FIG. 1. The music reproducing apparatus 10 is configured to receive an operation signal from a remote controller RM1 at a receiving block 11 to convert the received signal into an operation command. In accordance with this operation command, a control block 12 controls other component blocks of the music reproducing apparatus 10, thereby executing various processing operations.

Also, the music reproducing apparatus 10 is configured to handle audio data as content and have a plurality of functions associated with the recording and reproduction of audio data. The control block 12 is configured to switch between these functions in accordance with a command entered through the remote controller RM1 and display a GUI (Graphical User Interface) corresponding to each function onto a display block 13. It should be noted that the audio data as referenced herein denotes the data corresponding to a track (or a music track) that is music.

To be more specific, when a command comes from the remote controller RM1 for switching to a download function for downloading audio data, for example, the control block 12 of the music reproducing apparatus 10 displays a corresponding GUI screen onto the display block 13. Then, when a command comes for downloading audio data, the control block 12 accordingly receives audio data provided from a music providing server, not shown, at a network connection block 14 via a network NT, storing the received audio data into a content storage block 15.

Further, when a command comes from the remote controller RM1 for switching to a CD recording function for recording a CD, the control block 12 of the music reproducing apparatus 10 displays a GUI screen corresponding to the CD recording function onto the display block 13. Then, when a command comes for recording the CD, the control block 12 reads the audio data from the CD, not shown, loaded on the music reproducing apparatus 10 and executes data compression processing on this audio data, thereby storing the compressed audio data into the content storage block 15.

Still further, when a command comes from the remote controller RM1 for switching to a normal reproduction function for reproducing the audio data stored in the content storage block 15, the control block 12 of the music reproducing apparatus 10 displays a GUI screen corresponding to the normal reproduction function onto the display block 13. Then, when a command comes for reproducing the audio data, the control block 12 accordingly reads the audio data from the content storage block 15 and executes data decompression processing, equalizing processing, digital-to-analog conversion processing and amplification processing on this audio data in a reproducing block 16, thereby outputting music (or a music track) based on the processed audio data.

Yet further, when a command comes from the remote controller RM1 for switching to a CD reproduction function, the control block 12 of the music reproducing apparatus 10 displays a GUI screen corresponding to the CD reproduction function onto the display block 13. Then, when a command comes for reproducing the CD, the control block 12 reads the audio data from the CD, not shown, loaded on the music reproducing apparatus 10 and executes reproduction processing on this audio data in the reproducing block 16, thereby outputting music (or a music track) based on this audio data.

As described above, the control block 12 of the music reproducing apparatus 10 is configured to execute the processing operations according to various functions.

Figure 3:
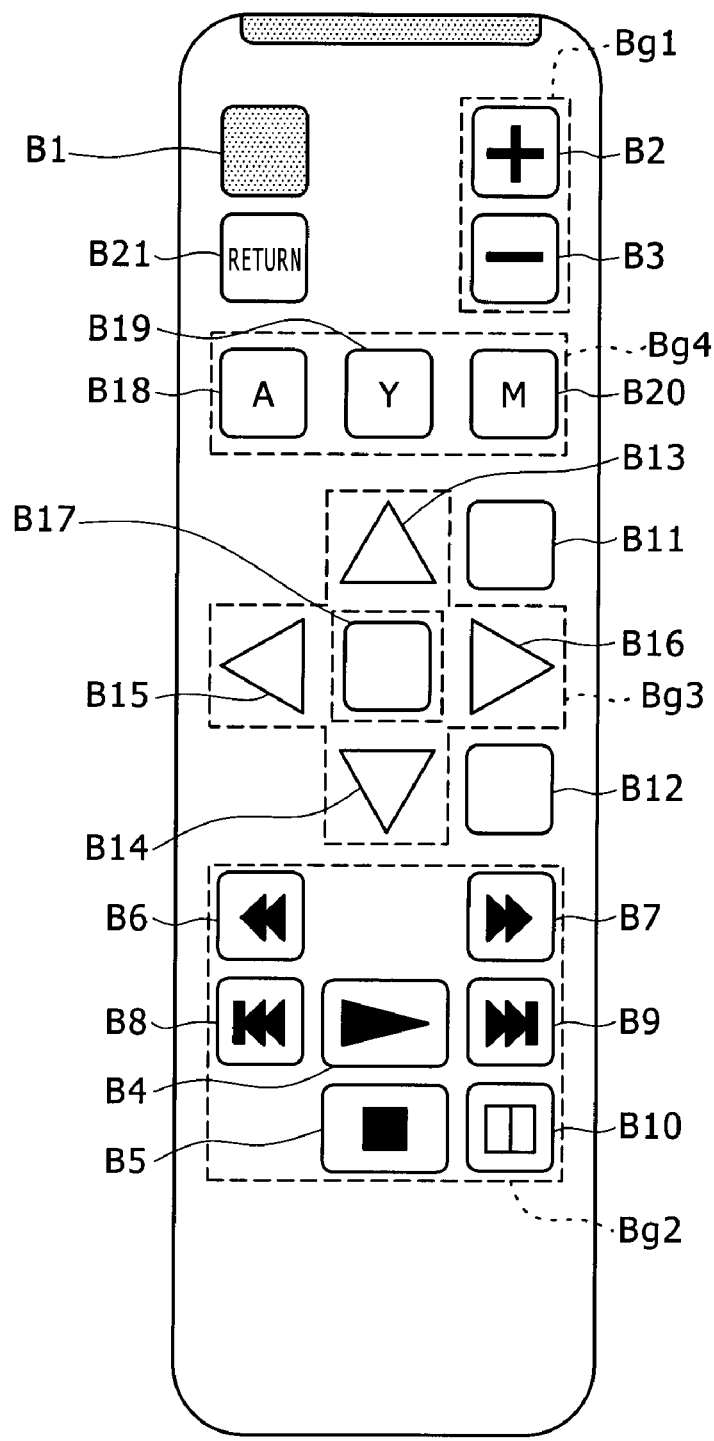
FIG. 3 is a top view illustrating a configuration of a remote controller.

The following describes a configuration of the remote controller RM1 with reference to FIG. 3. The remote controller RM1 has a power button B1 allocated with power-on/off commands for the music reproducing apparatus 10, a volume control Bg1 made up of volume control buttons B2 and B3 allocated with volume up and down commands respectively, a reproduction control block Bg2 made up of reproduction control buttons B4, B5, B6, B7, B8, B9, and B10 allocated with audio data reproduction control commands (play, stop, fast, rewind, cue, cue back, and pause) respectively, a function switching button B11 allocated with a function switching command, a setting button B12 allocated with commands for calling various settings, a cross button block Bg3 made up of an up button B13 and a down button B14 allocated with commands for operations in up and down directions on GUI screen respectively and a left button B15 and a right button B16 allocated with operations in left and right directions on GUI screen respectively, an enter button B17 allocated with an enter command on GUI screen, a related track switching block Bg4 made up of related track switching buttons B18, B19, and B20 allocated with related track switching commands to be described later, and a return button B21 allocated with a track return command to be described later.

Namely, the control block 12 of the music reproducing apparatus 10 is configured to switch between functions in accordance with a user operation done through the function switching button B11 arranged on the remote controller RM1. Also, the control block 12 is configured to control the reproduction of audio data when the normal reproduction function is selected in accordance with a user operation done through the reproduction control block Bg2, for example. Further, the control block 12 is configured to select and enter audio data to be downloaded when the download function is selected in accordance with a user operation done through the cross button block Bg3 and the enter button B17.

It should be noted that the remote controller RM1 and the receiving block 11 of the music reproducing apparatus 10 correspond to the input block 3 of the reproducing apparatus 1 (FIG. 1) described above and the control block 12, the content storage block 15, and the reproducing block 16 correspond to the control block 5, the content storage block 2, and the reproducing block 4 of the reproducing apparatus 1 respectively.

Further, in addition to the above-mentioned functions, the music reproducing apparatus 10 has a function that provides the user the music (or music tracks) based on the audio data stored in the content storage block 15 in a manner in which the user hears the music as if this music were broadcast from a radio station (hereafter, this function is referred to as the MusicStation function). The following describes this MusicStation function.

Described first is a method of managing audio data by the music reproducing apparatus 10, corresponding to the reproduction of audio data in this MusicStation function.

Figure 4:
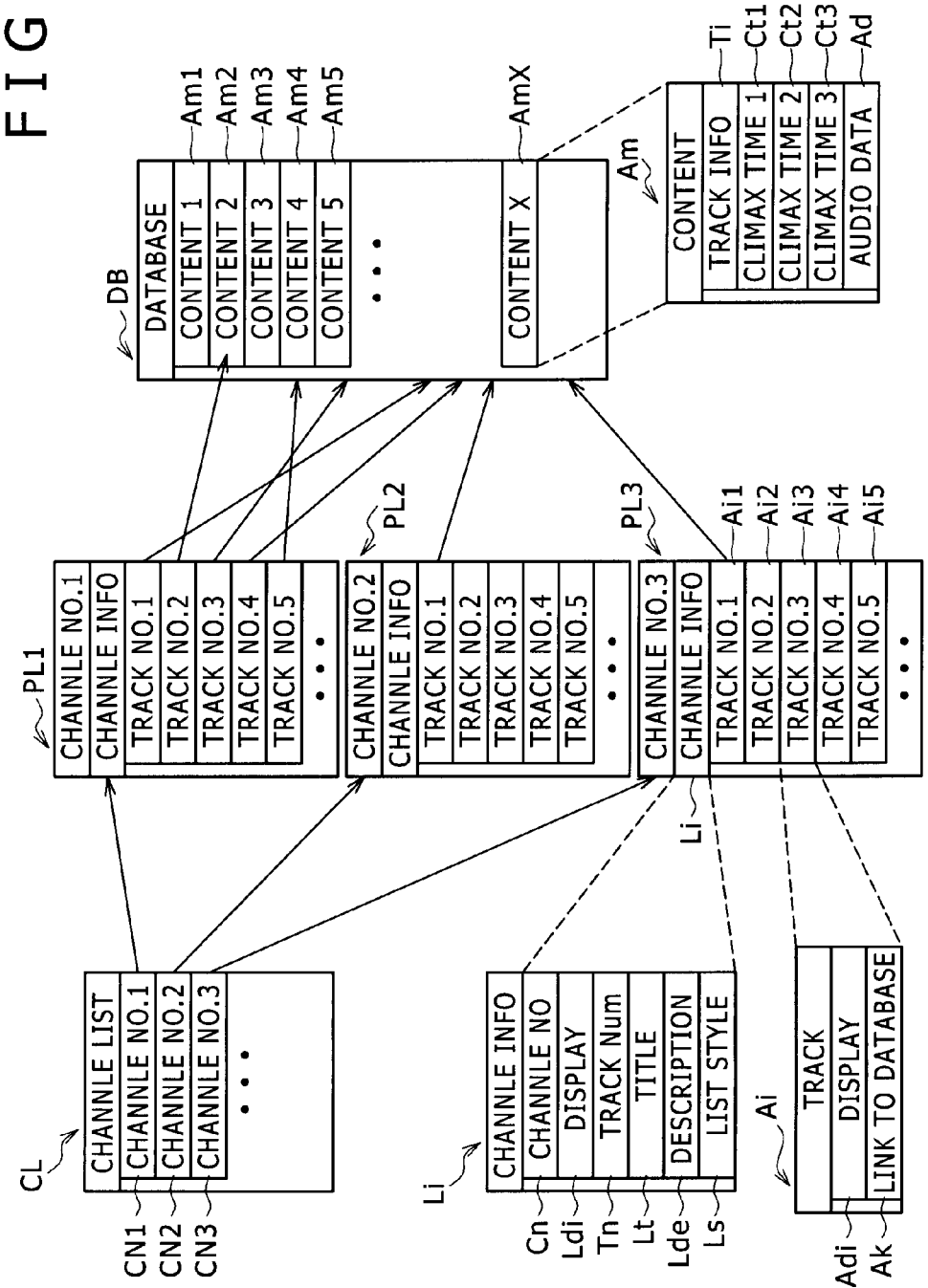
FIG. 4 is a schematic diagram illustrating exemplary management of audio data in the above-mentioned music reproducing apparatus.

As shown in FIG. 4, a database DB for managing audio data Ad in constructed in the content storage block 15. This database DB is configured to manage a plurality of pieces of audio data Ad by a plurality of pieces of audio data management information Am (Am1 through AmX) in an individual manner. Each piece of audio data management information Am includes attribute information Ti of audio data Ad and feature positional information Ct (Ct1 through Ct3) indicative of a feature reproduction position of music based on the audio data Ad (such as a bridge position and melody change position, which are hereafter referred to as a feature position).

Figures 5, 6:
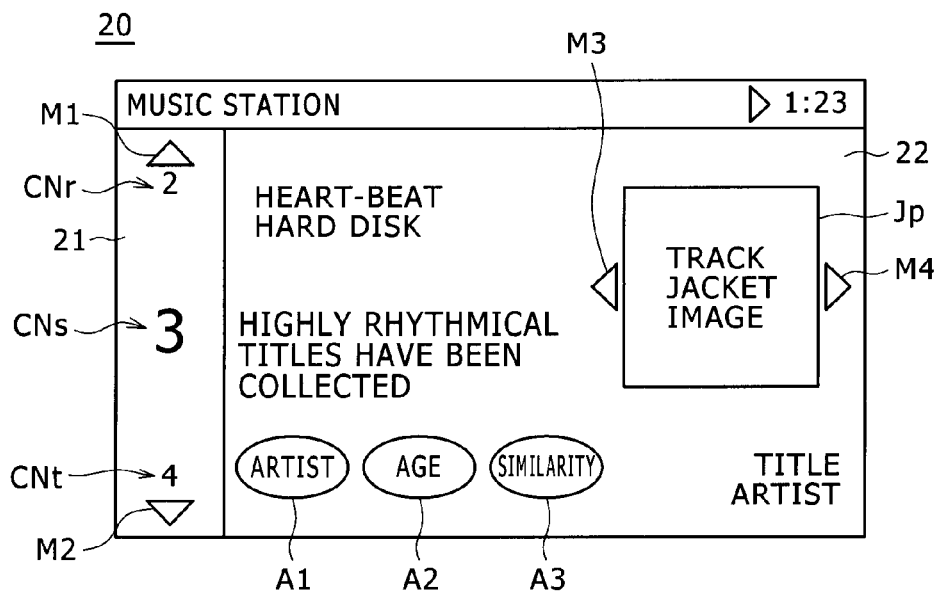
FIG. 5 is a table listing attribute information.
FIG. 6 shows a configuration of a selection screen.

As shown in FIG. 5, attribute information Ti is made up of music ID ("****1" for example) based on audio data Ad, music title ("Walk This Street" for example), artist name ("Aroesmith" for example), album name ("The Greatest Hit" for example), genre ("Rock" for example), release year ("2004" for example), recoding date ("2005/01/15 19:31:11" for example), play time ("04:35" for example), reproduction count ("13" for example) and jacket image recording position ("**.*" for example), feature data of music obtained as a result of frequency-analyzing audio data Ad (tempo "120" for example), (vocal "150" for example), and mood ("happy" for example), and cluster number obtained as a result of clustering based on feature data ("0082" for example).

It should be noted that tempo, one of the feature data, is obtained by numerically representing the play speed of that music track. Vocal denotes a numerical representation of the degree of the inclusion of vocal in that music track. When this value is low, it indicates that this music track is near instrumental. Mood denotes a word best indicative of the mood of that music track. If that music track is happy in mood, the mood is set to "happy", sad in mood, "sad", and bright in mood, "bright", for example. Further, the clustering based on feature data denotes an analysis in which music tracks similar in feature (hereafter referred to as similar music tracks) are classified into a same cluster number. Therefore, the audio data Ad having a same cluster number denotes music tracks similar in feature, thereby indicating similar music tracks.

It should be noted that attribute information Ti and feature positional information Ct (Ct1 through Ct3) are the information that is provided by a music providing server, for example.

On the other hand, a list storage block 17 (FIG. 2) stores a plurality of play lists PL (PL1 through PL3, . . . ) configured to manage the sequence of reproducing audio data Ad. It should be noted that each of these play lists is equivalent to a list of music tracks to be broadcast by each radio station channel, hereafter also being called channel play list PL (PL1 through PL3, . . . ).

Each of these channel lists PL (PL1 through PL3, . . . ) lists, in a sequence of tracks to be reproduced, audio data information Ai (Ai1 through Ai5, . . . ) that is the content identification information for each audio data Ad to be reproduced. The reproduction sequence of audio data Ad is managed by the audio data information Ai (Ai1 through Ai5, . . . ) arranged in a sequence of music tracks to be reproduced. It should be noted the reproduction sequence of these audio data information Ai (Ai1 through Ai5, . . . ) provides track numbers of audio data information Ai (Ai1 through Ai5, . . . ).

It should be noted that each of audio data information Ai (Ai1 through Ai5, . . . ) includes a link AK to audio data Ad on the database DB built in the content storage block 15. By this link AK, the audio data Ad to be reproduced is specified. In addition, each of audio data information Ai (Ai1 through Ai5, . . . ) includes audio data reproduction setting Adi indicative of enabling/disabling, on a audio data Ad basis, the reproduction of the audio data Ad specified by the link AK.

Namely, each of a plurality of channel play lists PL (PL1 through PL3, . . . ) indicates a reproduction sequence of audio data Ad and reproduction setting (reproduction enabled or disabled) on a audio data Ad basis.

Further, each of a plurality of channel play lists PL (PL1 through PL3, . . . ) includes list information Li that is list identification information for each channel play list PL. This list information Li has channel number Cn allocated to the channel play list, list reproduction setting Ldi indicative of enabling or disabling, on a channel play list basis, the reproduction of the audio data Ad registered in the channel play list PL, the number of Tn pieces of audio data information Ai in the channel play list (namely, the number of pieces of audio data Ad registered in the channel play list PL, hereafter also being referred to as the number of registered data), a list name Lt that is the name of the channel play list PL, and track sequence setting ls in the channel play list PL.

It should be noted that the list reproduction setting Ldi can normally be set by the user to either "reproduction enabled" or "reproduction disabled". There is at least one channel play list PL with this list reproduction setting Ldi fixed to "reproduction enabled". Namely, this channel play list PL is a list that is always enabled for the reproduction of audio data Ad, hereafter also being referred to as a default play list DPL. List description Lde has a text specifically describing the channel play list PL ("Cheerful music tracks have been collected", for example) and a keyword indicative of the feature of this channel play list PL ("Cheerful" for example). Further, music track setting Ls shows that audio data Ad is reproduced in a fixed reproduction sequence (namely, a list sequence) indicated in the channel play list PL or the reproduction sequence indicated in the channel play list PL is randomly sorted and the audio data is reproduced in the sorted sequence (namely, shuffle reproduction).

In addition to a plurality of channel play lists PL (PL1 through PL3, . . . ), the list storage block 17 stores a list CL of channels available for the MusicStation function (hereafter also referred to as a channel list). This channel list CL is a list of a plurality of channel numbers CN (CN1 through CN3, . . . ) sorted in a sequence of numbers, these channel numbers CN corresponding to channel numbers Cn allocated to the channel play list PL. Namely, this channel list CL is configured to manage a plurality of channel lists PL (PL1 through PL3, . . . ) by channel numbers CN.

It should be noted that the channels and the channel play lists PL (PL1 through PL3, . . . ) available for the MusicStation function need not have a one-to-one correlation; therefore, a plurality of channel play lists PL may be allocated to one channel.

Thus, the music reproducing apparatus 10 is configured to manage a plurality of channel play lists PL by the channel list CL and the reproduction sequence of audio data Ad by each of the plurality of channel play lists PL.

It should be noted that the above-mentioned channel play lists PL (PL1 through PL3, . . . ) to be handled by the MusicStation function include, in advance, such channel play lists PL configured on the basis of a reproduction count indicated in attribute information Ti of audio data Ad as a channel play list PL made up of audio data Ad corresponding to a newly added music track (hereafter also referred to as a newly added list) and a channel play list PL made up of audio data Ad corresponding to a music track that has been reproduced infrequently (or frequently) (hereafter also referred to as an infrequently (or frequently) reproduced music track list), such channel play lists PL configured on the basis of music impression values indicated in attribute information Ti of audio data Ad as a channel play list PL made up of audio data Ad corresponding to rhythmic music (hereafter also referred to as a rhythmic music list) and a channel play list made up of audio data Ad corresponding to cheerful music (hereafter also referred to as a cheerful music list), and such channel play lists PL configured on the basis of genre indicated in attribute information Ti of audio data Ad as a channel play list PL made up of audio data Ad corresponding to classical music (hereafter also referred to as a classical music list) and a channel play list PL made up of audio data Ad corresponding to heavy metal (hereafter also referred to as a heavy metal music list), for example.

The channel play list PL based on reproduction count is automatically updated every time audio data Ad is newly stored in the content storage block 15 and every time audio data Ad is reproduced.

To be more specific, the frequently reproduced music list PL has keywords, such as "reproduction count" and "top 10", for example. After newly storing audio data Ad or reproducing audio data Ad, the control block 12 of the music reproducing apparatus 10 chooses 10 tracks of audio data Ad that have been reproduced most frequently from audio data stored in the content storage block 15 on the basis of these keywords "reproduction count" and "top 10", thereby updating the frequently reproduced music list PL so as to configure this music list with the selected audio data Ad.

The channel play list PL based on music feature data and the channel play list PL based on genre are automatically updated every time audio data Ad is newly stored in the content storage block 15. To be more specific, the cheerful music list PL has "cheerful" as a keyword, for example. After newly storing audio data Ad into the content storage block 15, the control block 12 of the music reproducing apparatus 10 updates this cheerful music list PL so as to additionally register this audio data Ad to the cheerful music list PL if the value indicative of the cheerfulness of the impression value of newly stored audio data Ad is found higher than a predetermined level on the basis of this keyword "cheerful". The classical music list PL has "classical" as a keyword. After newly storing audio data Ad into the content storage block 15, the control block 12 of the music reproducing apparatus 10 updates the classical music list PL so as to additionally register this audio data Ad to the classical music list PL if the genre of the newly stored audio data Ad is found to be "classical" on the basis of this keyword "classical".

Thus, the MusicStation function has channel play lists PL for such genres considered to be required by users as newly added music, infrequently reproduced music, rhythmical music, cheerful music, classical music, and heavy metal music, for example. The music reproducing apparatus 10 is configured to automatically execute channel play list updating by registering audio data Ad stored in the content storage block 15 into corresponding one of the prepared channel play lists PL on the basis of reproduction count, music impression value, and genre, for example, every time audio data Ad is stored or reproduced.

Then, the music reproducing apparatus 10 selects, on a GUI screen to be described later, on the basis of user operation, a channel play list PL classified by newly added music, infrequently reproduced music, rhythmical music, cheerful music, classical music, or heavy metal music, for example, as channels, thereby allowing the user to easily find desired music in a feeling in which the user switches between radio channels.

The following describes GUI screens that are displayed when the MusicStation function is turned on. When a MusicStation function startup command is given by the user through the function switching button B11 of the remote controller RM1, the music reproducing apparatus 10 starts the MusicStation function, thereby displaying a selection screen 20 for channel and music selection onto the display block 13 as a GUI screen shown in FIG. 6, for example.

With the selection screen 20, a channel selection area 21 is arranged vertically at the left end of the screen and a track selection area 22 is arranged in the remaining space of the screen. In the center of the channel selection area 21, currently selected channel number CNs ("3" for example) is shown, which is one of channel numbers CN (CN1 through CN3, . . . ) in channel list CL. In the top and bottom of the channel selection area 21, channel numbers CNr ("2" for example) and CNt ("4" for example) are shown which are selectable from the currently selected channel, in a sequence of channel numbers CN (CN1 through CN3, . . . ) in channel list CL.

Further, in the top vicinity of channel number CNr, a triangular first mark M1 is shown. In the bottom vicinity of channel number CNt, an upside down triangular second mark M2 is shown. These first and second marks correspond to the up button B13 and the down button B14 arranged on the remote controller RM1 respectively. When the up button B13 is pressed, the currently selected channel can be switched to a channel having channel number CNr. When the down button B14 is pressed, the currently selected channel can be switched to a channel having channel number CNt.

In response to the channel switching operation through the up button B13 or the down button B14 arranged on the remote controller RM1, the control block 12 of the music reproducing apparatus 10 switches between channel numbers CNs to be displayed in the channel selection area 11 in the sequence of channel numbers CN (CN1 through CN3, . . . ) (namely, switches between channels), thereby allowing the user to easily recognize channel switching.

On the other hand, the track selection area 22 shows a list name ("Heart-Beat Hard Disk" for example) of a channel play list allocated to a channel in selection (hereafter referred to also as a list in selection) and a list description text ("Rhythmical tunes are collected" for example) on the left side of the track selection area 12. In response to a channel switching operation through the up button B13 or the down button B14 arranged on the remote controller RM1, the control block 12 of the music reproducing apparatus 10 switches between list names and list description texts to be displayed in the track selection area 12, thereby allowing the user to easily recognize the contents of a channel in selection.

The right side of the track selection area 22 shows a jacket image Jp corresponding to the music in selection (namely, a music track based on audio data Ad corresponding to audio data information Ai selected from the list PL in selection) and, below the jacket image Jp, a music title and an artist name corresponding to the music in selection.

In addition, in the left vicinity of the jacket image Jp, a triangular third mark M3 is shown with its top directed to the left, while, in the right vicinity of the jacket image Jp, a triangular fourth mark M4 is shown with its top directed to the right. These third and fourth marks corresponding to the left button B15 and the right button B16 arranged don the remote controller RM1 respectively. When the left button B15 is pressed, a track based on the immediately preceding audio data Ad can be selected in accordance with the in-selection list PL. When the right button B16 is pressed, a track based on the immediately following audio data Ad can be selected in accordance with the in-selection list PL.

Further, if the audio data Ad of a track related with the track in selection is stored in the content storage block 15, related-track notification icons A1, A2, and A3 for notifying the user thereof are displayed at the bottom of this selection screen. The related-track notification icon A1 is an icon that is displayed when the audio data Ad of a track of a same artist as the currently selected track is stored in the content storage block 15, which is also hereafter referred to as a same-artist track icon A1. The related-track notification icon A2 is an icon that is displayed when the audio data Ad of a track of a same age as the currently selected track is stored in the content storage block 15, which is also hereafter referred to as a same-age track icon A2. The related-track notification icon A3 is an icon that is displayed when the audio data of a track similar to the currently selected track is stored in the content storage block 15, which is also hereafter referred to as a similar-track icon A3.

It should be noted that the control block 12 of the music reproducing apparatus 10 determines whether the audio data Ad of a track related with the currently selected track is stored in the content storage block 15 by referencing the artist name, release year, and cluster number written in the attribute information Ti of each piece of audio data Ad.

Then, in accordance with a track switching operation done through the left button B15 or the right button B16 of the remote controller RM1, the control block 12 of the music reproducing apparatus 10 switches to a jacket image Jp, a track title, and an artist name to be displayed on a track selection area 22 (namely, selects a specified track) and, at the same time, depending on whether the audio data Ad corresponding to the track related with the track after selection is stored in the content storage block 15, redisplays the related-track icons A1, A2, and A3, thereby letting the user easily recognize the contents of the track in selection and the existence of any related track.

Thus, the music reproducing apparatus 10 switches between channels as instructed by the user through the up button B13 and the down button B14 of the remote controller RM1 and switches between music tracks as instructed by the user through the left button B15 and the right button B16 of the remote controller RM1, while allowing the user to visually recognize the contents of channel and music on the selection screen 20.

It should be noted that, starting up the MusicStation function, the control block 12 of the music reproducing apparatus 10 selects a channel selected at the end of the last MusicStation function and, at the same time, selects audio data Ad registered in a channel play list PL allocated to this channel, thereby automatically starting reproduction from the feature position this audio data Ad. Therefore, the selection screen 20 immediately after the MusicStation function is started displays the channel as it was at the end of the last MusicStation function and the music track based on the audio data Ad registered in the channel play list PL allocated to this channel.

Figure 7:
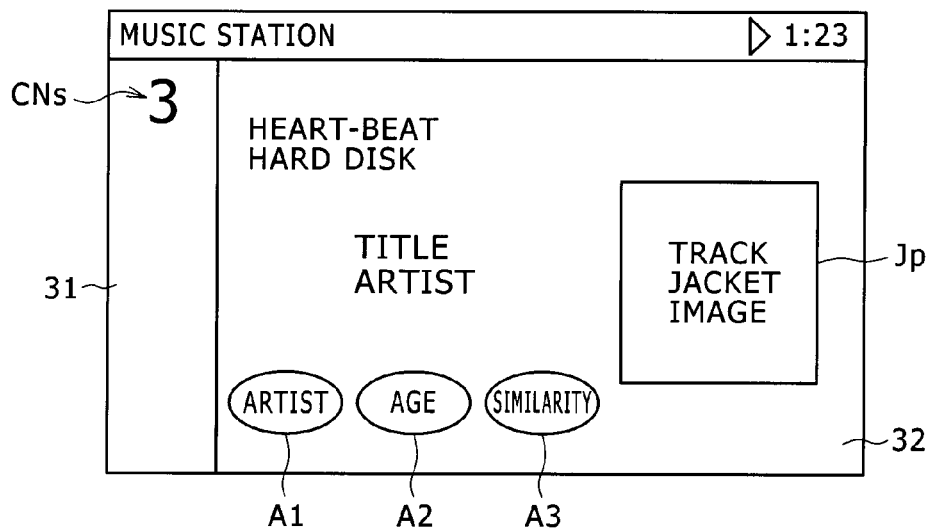
FIG. 7 shows a configuration of a reproduction screen.

If the enter button B17 of the remote controller RM1 is pressed with the selection screen 20 displayed, the control block 12 of the music reproducing apparatus 10 switches the GUI screen from the selection screen 20 to a reproducing screen 30 as shown in FIG. 7.

In the reproducing screen 30, a selected channel display area 31 is arranged at the left end of the screen and a selected music display area 32 is arranged in the rest of the screen. The selected channel display area 31 shows only channel number CNs ("3" for example) of the channel in selection. On the other hand, the selected music display area 32 shows the list name of a channel play list PL (namely, the a list in selection) allocated to the channel in selection at the left of the screen and the track title and track artist corresponding to the music track in selection. In addition, jacket image Jp corresponding to the music track in selection is shown at the right side of the screen of the selected music display area 32.

Further, like the track select area of the selection screen 20, if the audio data Ad of a track of the same artist as the selected track is stored in the content storage block 15, the same-artist track icon A1 is displayed at the bottom of the selected track display area 32; if the audio data Ad of a track of a same age as the selected track is stored in the content storage block 15, the same-age track icon A2 is displayed; and, if the audio data of a track similar to the selected track is stored in the content storage block 15, the similar-track icon A3 is displayed.

Thus, the music reproducing apparatus 10 is configured to allow the user to visually recognize the selected channel and the contents of music on the reproducing screen 30.

It should be noted that, if no operation has been done through the remote controller RM1 for a predetermined period after displaying the selection screen 20, the control block 12 of the music reproducing apparatus 10 also switches between GUI screens from the selection screen 20 to the reproducing screen 30 as with the case in which the enter button B17 of the remote controller RM1 has been pressed.

Further, recognizing a channel switching operation done through the up button B13 or the down button B14 of the remote controller RM1 or a track switching operation done through the left button B15 or the right button B16 of the remote controller RM1 with the reproducing screen 30 displayed, the control block 12 switches between GUI screens from the reproducing screen 30 to the selection screen 20 again.

Figure 8:
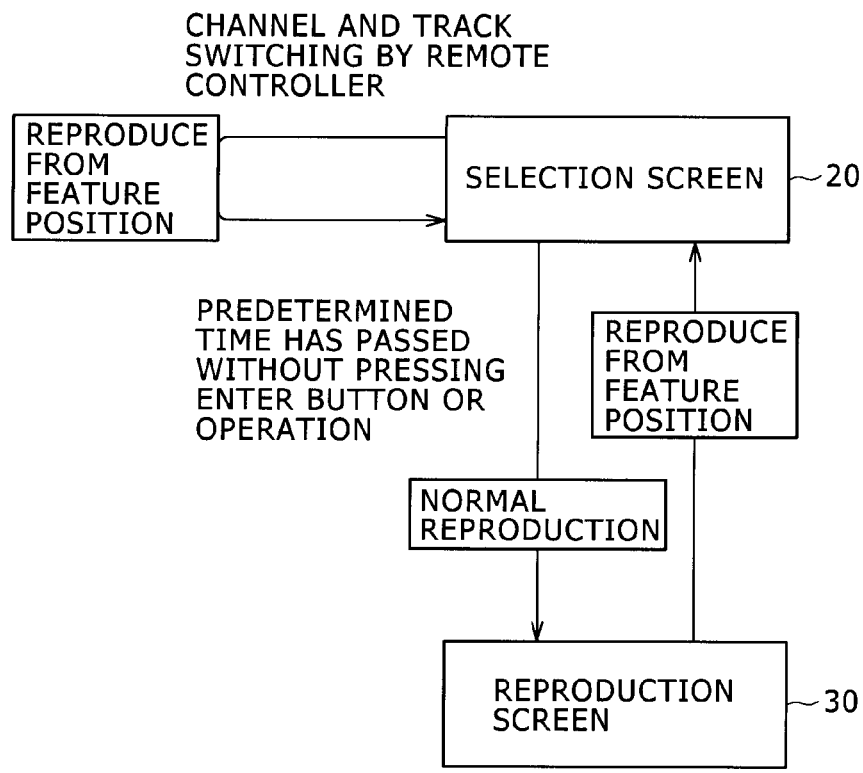
FIG. 8 is a block diagram illustrating screen switching and reproduction control involved in the screen switching.

The following describes the above-mentioned GUI screen switching operation and the accompanying reproduction control of audio data Ad with reference to FIG. 8. Starting up the MusicStation function, the control block 12 of the music reproducing apparatus 10 displays the selection screen 20 and, at the same time, gets in a partial reproduction mode in which to reproduce audio data Ad from a feature position.

In this partial reproduction mode, the control block 12 of the music reproducing apparatus 10 executes channel switching in accordance with a channel switching operation done on the selection screen 20 in accordance with a channel switching operation through the remote controller RM1 and, at the same time, switches music to a music track of the channel after the switching and, in accordance with a music track switching operation, switches between music tracks within the same channel. Every time the music track switching is executed, the control block 12 of the music reproducing apparatus 10 reproduces the audio data Ad of the newly selected music track from the feature position thereof.

It should be noted that many users remember feature parts of music (namely, a bridge and a melody change part, for example) and recognize particular music tracks by listening these feature parts. Namely, the music reproducing apparatus 10 lets each user listen these feature parts by reproducing audio data Ad from feature positions, thereby allowing the user to easily recognize a particular music track based on the reproduced audio data Ad.

Also, every time a channel switching operation and a music track switching operation is executed, the music reproducing apparatus 10 reproduces the audio data Ad corresponding to a newly selected music track from a feature position thereof, thereby allowing the user execute channel and music track switching in a zapping manner.

Further, also at the time of channel switching, the music reproducing apparatus 10 can execute music track switching to reproduce the audio data Ad corresponding to a newly selected music track, thereby letting the user hear the music track as if the user heard music broadcast from a radio station without discontinuation of the reproduction of the audio data Ad after the channel switching.

Still further, because the music reproducing apparatus 10 allocates channel play lists PL corresponding to user-desired categories to selectable channels as described above, thereby allowing the user to switch to any desired channel to retrieve any desired music tracks.

When the enter button B17 of the remote controller RM1 is pressed in the partial reproduction mode or a predetermined period of time has passed without a user operation on the remote controller RM1, then the control block 12 of the music reproducing apparatus 10 switches GUI screen display to the reproducing screen 30 and, at the same time, gets in a normal reproduction mode in which audio data Ad is normally reproduced. In this normal reproduction mode, the audio data Ad corresponding to the selected music track is reproduced up to the end thereof to let the user hear the entire part of the music track.

Then, the control block 12 of the music reproducing apparatus 10 sequentially reproduces the music track Ad from the start position thereof in accordance with the selected list PL until a channel switching operation or a music track switching operation is done through the remote controller RM1. Next, when a channel switching operation or a music track switching operation is done through the remote controller RM1, the control block 12 of the music reproducing apparatus 10 gets in the partial reproduction mode again.

Thus, the control block 12 of the music reproducing apparatus 10 appropriately switches between the partial reproduction mode and the normal reproduction mode. In any of these modes, audio data Ad is always reproduced without discontinuation as far as the MusicStation function is executed.

Figure 9:
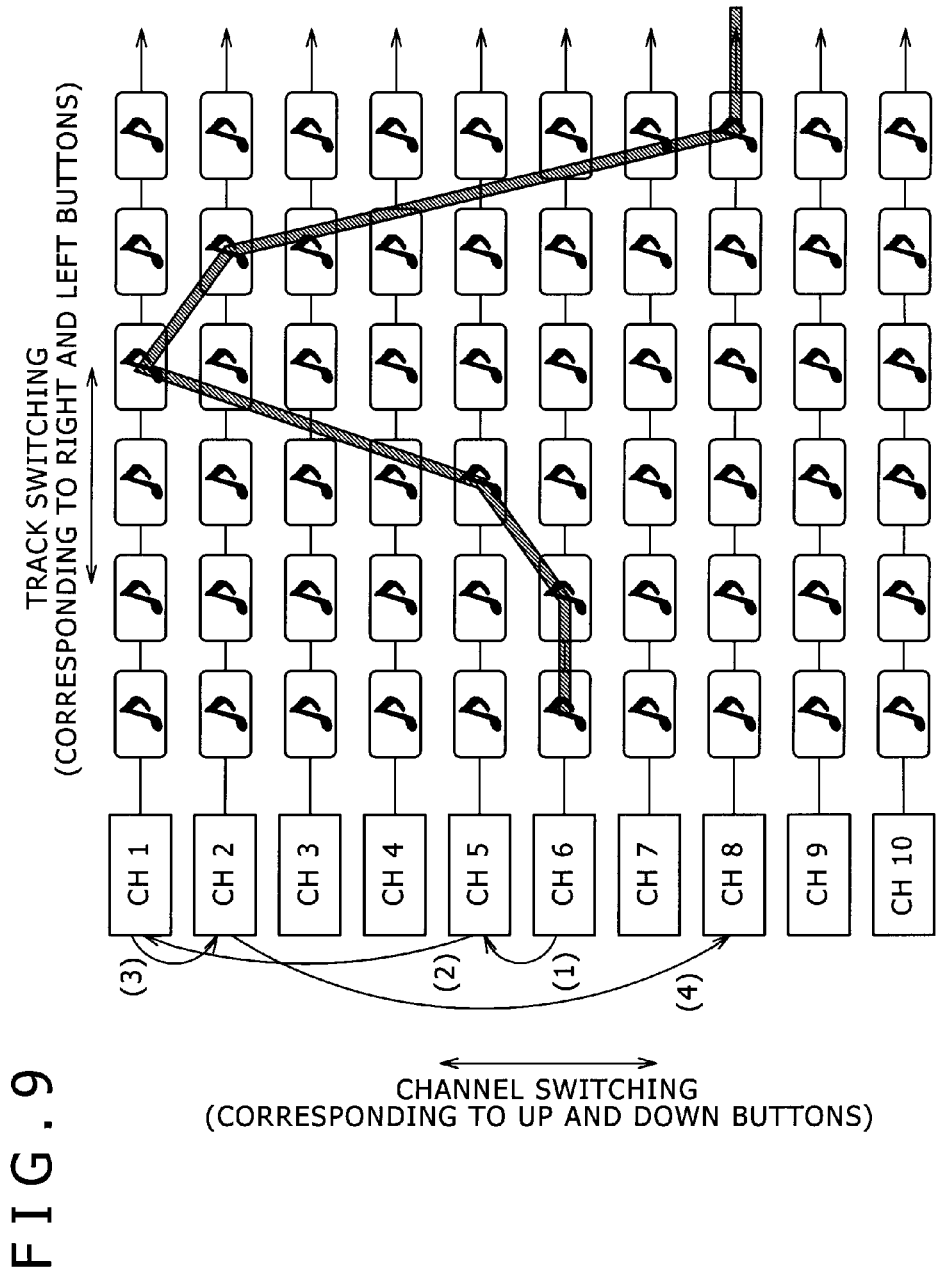
FIG. 9 is a schematic diagram illustrating a manner in which channel switching and track switching are executed.

Consequently, when the MusicStation function is executed, in accordance with the operation of the up button B13 or the down button B14 of the remote controller RM1, the music reproducing apparatus 10 allows the switching between channel play lists PL on a channel basis as if preset radio stations were switched between and, in accordance with the operation of the left button B15 and the right button B16, the switching between music tracks within each channel as shown in FIG. 9, thereby letting the user hear desired music tracks as if the user heard music tracks broadcast from a radio station.

The following describes a MusicStation function startup procedure, a channel switching procedure, and a music track switching procedure.

Figure 10:
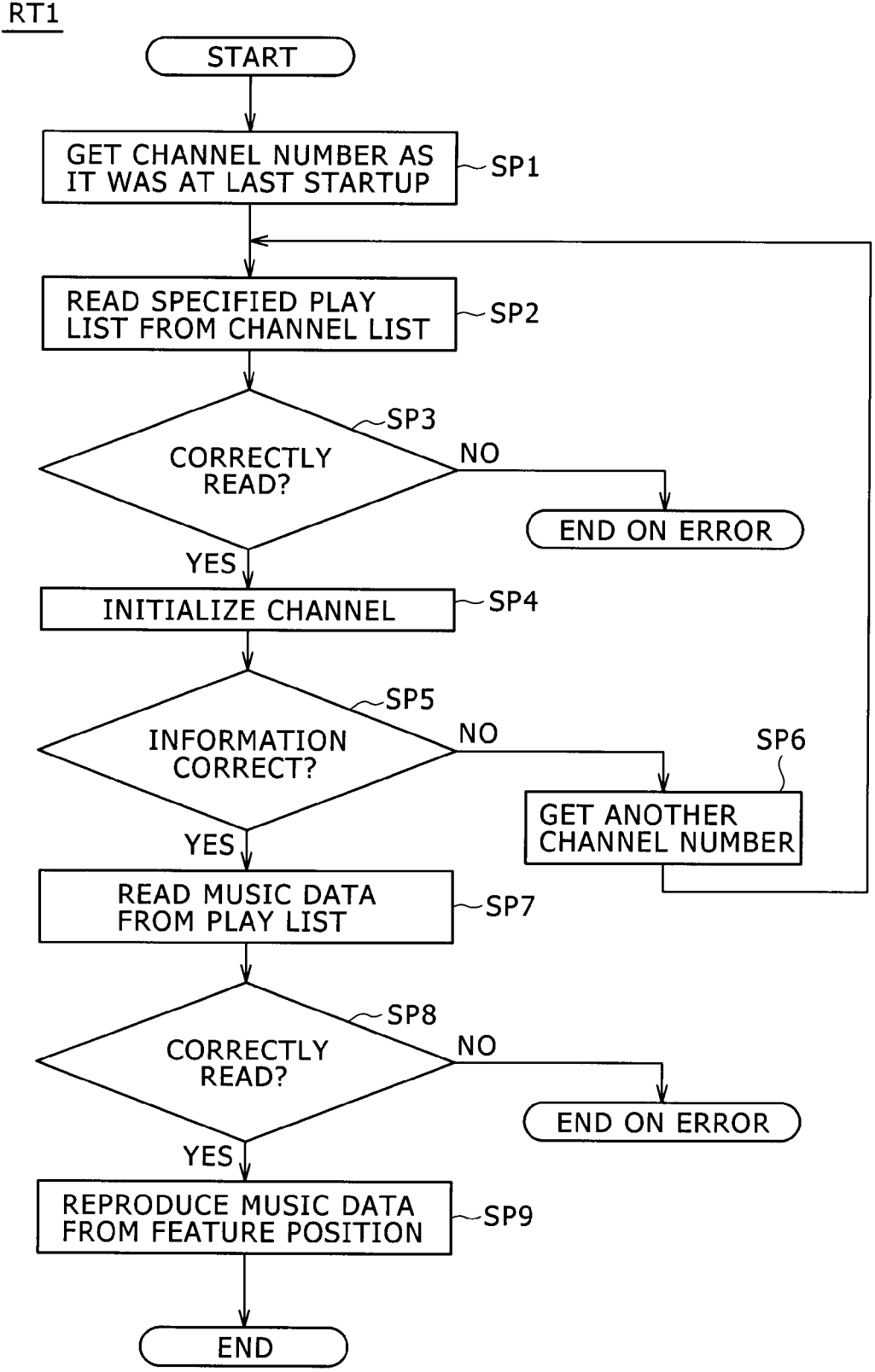
FIG. 10 is a flowchart indicative of a Music Function startup procedure.

First, the MusicStation function startup procedure will be described. As shown in FIG. 10, recognizing a MusicStation function startup operation done through the remote controller RM1, the control block 12 of the music reproducing apparatus 10 starts MusicStation function startup procedure RT1, upon which the procedure goes to step SP1.

In step SP1, the control block 12 of the music reproducing apparatus 10 gets the channel number CN of a channel selected last at the last startup of the MusicStation function, upon which the procedure goes to step SP2. It should be noted that the control block 12 of the music reproducing apparatus 10 stores the information indicative of the channel number CN of the channel in selection (hereafter referred to also as selected channel information) into the content storage block 15 or the list storage block 17 and, at the same time, updates this selected channel information every time channel number switching is executed. Namely, the channel number CN indicated in the selected channel information stored in the content storage block 15 or the list storage block 17 at this moment is the channel number CN selected last. By getting this selected channel information, the control block 12 gets the channel number CN selected last at the time of the last startup.

In step SP2, the control block 12 specifies a channel play list PL corresponding to the obtained channel number CN on the basis of channel list CL and reads this specified channel play list (hereafter also referred to as a specified list) from the storage block 6, upon which the procedure goes to step SP3.

In step SP3, the control block 12 determines whether the specified list LP has been correctly read. If the determination is in the negative, then it indicates that the specified list PL has not been correctly read due to data damage in the specified list PL, for example, upon which the control block 12 abnormally ends this MusicStation function startup procedure RT1.

On the other hand, if the determination is in the affirmative, then the control block 12 recognizes that the specified list PL has been correctly read, upon which the procedure goes to step SP4.

In step SP4, the control block 12 initializes the specified list PL (hereafter referred to also as channel initialization processing). This channel initialization processing includes the sort processing in which, if shuffle reproduction is specified in the music track sequence setting Ls of the channel play list PL, the sequence of music tracks to be reproduced is sorted in a random manner, for example. After the execution of this channel initialization processing, the procedure goes to step SP5.

In step SP5, the control block 12 determines whether the information of the specified list PL after the channel initialization processing (namely, list information Li and audio data information Ai) is correct or not. If the determination is in the negative, it indicates that the information of the specified list PL is not correct because the reproduction of the audio data Ad by the specified list PL is disabled by the list reproduction setting Ldi contained in the list information Li of specified list PL, for example, upon which the procedure goes to step SP6. In step SP6, the control block 12 newly gets the channel number CN of a channel allocated with default play list DPL, for example, in which the reproduction of audio data Ad is permitted. Then, the procedure returns to step SP2 to read the channel play list PL corresponding to the newly obtained channel number CN.

On the other hand, if the determination in SP5 is in the affirmative, then the control block 12 recognizes that the information of the specified list PL is correct, upon which the procedure goes to step SP7.

In step SP7, the control block 12 specifies one piece of audio data Ad (for example, audio data Ad to be reproduced first) from the specified list PL and reads the specified audio data Ad (hereafter referred to also as specified audio data) from the storage block 6, upon which the procedure goes to step S8.

In step SP8, the control block 12 determines whether the specified audio data Ad has been correctly read or not. If the determination is in the negative, then it indicates that the specified audio data Ad has not been correctly read because of the damage of the specified audio data Ad, for example, upon which the control block 12 abnormally ends this MusicStation function startup processing RT1.

On the other hand, if the determination is in the affirmative, the control block 12 recognizes that the specified audio data Ad has been correctly read, upon which the procedure goes to step SP9. In step SP9, the control block 12 displays the channel number CN obtained in step SP1 or step SP6 as the channel number CNs of the channel in selection, displays, on the display block 13, the selection screen 20 with list information Li (list name Lt and list description Lde) of the specified list PL read in step SP2 and attribute information Ti (jacket image, track title, and artist name) of the specified list PL read in step S2, and starts the reproduction of the specified audio data Ad from a feature position (for example, a position indicated by one of three feature positional information Ct1 through Ct3), thereby ending this MusicStation function startup procedure RT1.

By following MusicStation function startup procedure RT1 described above, the music reproducing apparatus 10 starts up the MusicStation function.

Thus, the control block 12 of the music reproducing apparatus 10 automatically starts the reproduction of audio data Ad after starting up the MusicStation function, thereby providing the user with the music based on audio data Ad as if broadcast from a radio station.

Figure 11:
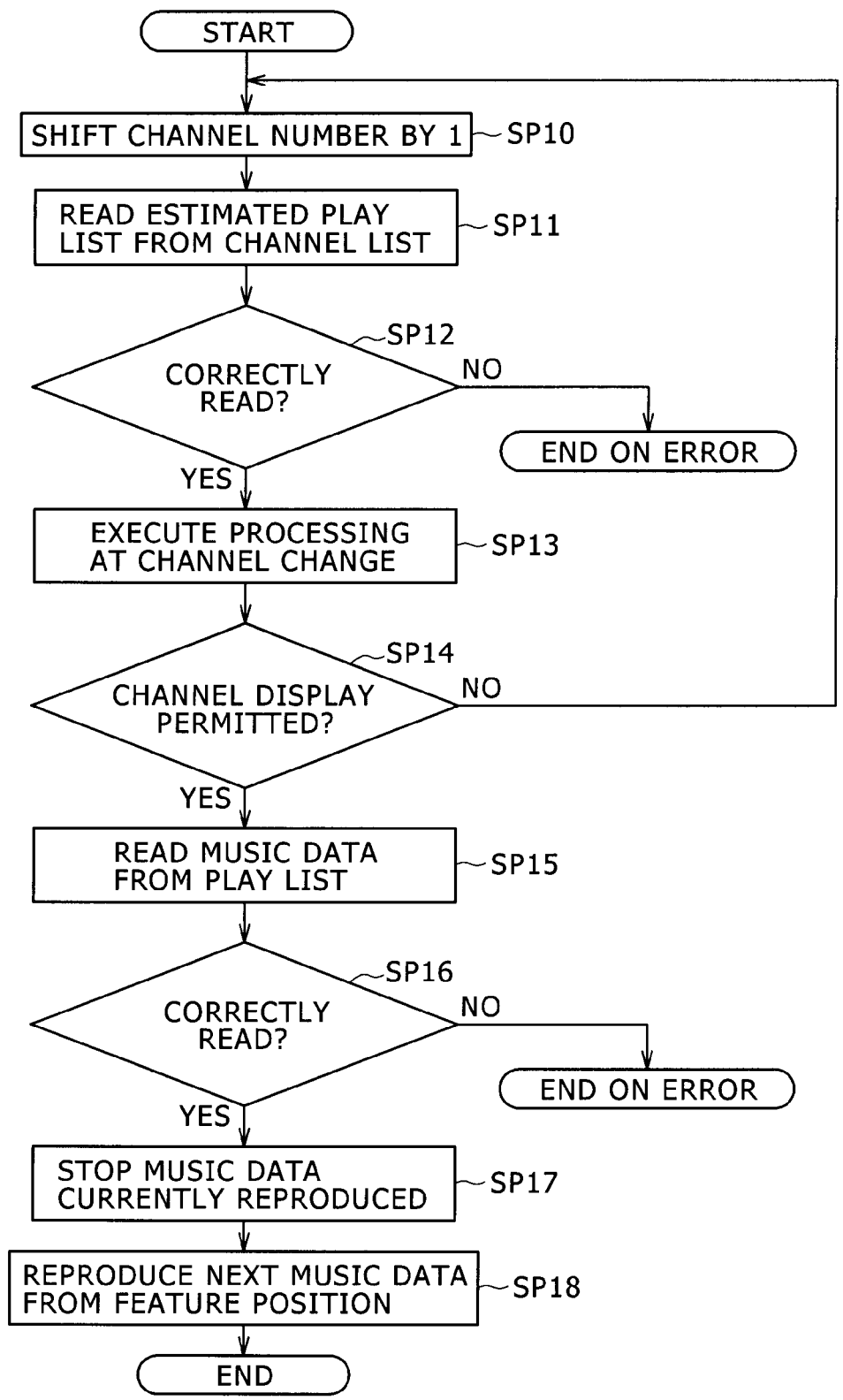
FIG. 11 is a flowchart indicative of a channel switching procedure.

The following describes a channel switching procedure in the MusicStation function. As shown in FIG. 11, the control block 12 of the music reproducing apparatus 10 starts the MusicStation function and, upon recognition of a channel switching operation done through the up button B13 or the down button B14 of the remote controller RM1 while audio data Ad is being reproduced, starts channel switching procedure TR2, upon which the procedure goes to step SP10.

In step SP10, when the up button B13 of the remote controller RM1 is pressed, the control block 12 decrements the channel number CN by 1 (namely, channel number CNr) or, when the down button B14 is pressed, increments by 1 (namely, channel number CNt) with reference to the channel number CN of the channel selected immediately before this channel switching operation is done (namely, the channel number CNs displayed on the selection screen 20) and uses the resultant channel number as channel number CN after switching, upon which the procedure goes to step SP11.

It should be noted that the control block 12 is configured to control the switching of channel numbers CN in a circular manner by connecting the head of channel numbers CN with the tail thereof. Namely, while recognizing head channel number CN minus 1 as the tail channel number CN in step SP10, the control block 12 recognizes tail channel number CN plus 1 as the head channel number CN.

In step SP11, the control block 12 specifies the channel play list PL corresponding to the channel number CN after switching on the basis of channel list CL and reads this specified channel play list PL (or the specified list) from the storage block 17, upon which the procedure goes to step SP12.

In step SP12, the control block 12 determines whether the specified list PL has been correctly read or not. If the determination is in the negative, it indicates that this specified list has not been correctly read because of damaged data in the specified list, for example, upon which the control block 12 abnormally ends this channel switching procedure RT2.

On the other hand, if the determination is in the affirmative in step S12, then the control block 12 recognizes that the specified list LP has been correctly read, upon which the procedure goes to step SP13.

In step SP13, the control block 12 executes the processing (hereafter also referred to as channel change time processing) on the specified list PL. This channel change time processing includes the reconfiguration of the channel play list PL made up of the audio data Ad corresponding to frequently reproduced music tracks in accordance with the reproduction count of each audio data Ad up to this moment. When this channel change time processing has been completed, the procedure goes to step SP14.

In step SP14, the control block 12 determines on the basis of list reproduction setting Ldi included in list information Li of the specified list PL after the channel change time processing whether the displaying of a channel allocated with this specified list PL is permitted or not. If the determination is in the negative, it indicates that the displaying of the channel allocated with this specified list PL is disabled because the reproduction of the audio data Ad registered in the specified list PL is disabled, upon which the procedure returns to step SP10. In step SP10, the control block 12 further increments or decrements the channel number CN after switching obtained previously by 1 and uses the resultant channel number as a new channel number CN after switching.

On the other hand, if the determination is in the affirmative in step SP14, then the control block 12 recognizes that the displaying of the channel allocated with this specified list is enabled because the reproduction of the audio data Ad registered in the specified list PL is permitted, upon which the procedure goes to step SP15.

In step SP 15, the control block 12 specifies audio data Ad (for example, the audio data to be reproduced first in a reproduction sequence) from the specified list PL and reads the specified audio data Ad from the storage block 6, upon which the procedure goes to step SP16.

In step SP16, the control block 12 determines whether the specified audio data Ad has been correctly read or not. If the determination is in the negative, it indicates that this specified audio data Ad has not been correctly read because the specified audio data Ad is damaged, for example, upon which the control block 12 abnormally ends this channel switching procedure RT2.

On the other hand, if the determination is in the affirmative in step SP16, then the control block 12 recognizes that the specified audio data Ad has been correctly read, upon which the procedure goes to step SP17. In step SP17, the control block 12 pauses the reproduction of the currently reproduced audio data Ad, displays the channel number CN after switching obtained in step SP10 as the channel number CNs in selection, displays, on the display block 13, the selection screen 20 showing list information Li (list name Lt and list description Lde) of the specified list PL read in step SP15 and attribute information Ti (jacket image, track title, and artist name) of the specified audio data Ad read in step SP15, and starts the reproduction of the specified audio data Ad from a feature position (for example, a position indicated by one of three feature positional information Ct1 through Ct3), thereby ending this channel switching procedure RT2.

By the above-mentioned channel switching procedure RT2, the music reproducing apparatus 10 switches between channels.

Figure 12:
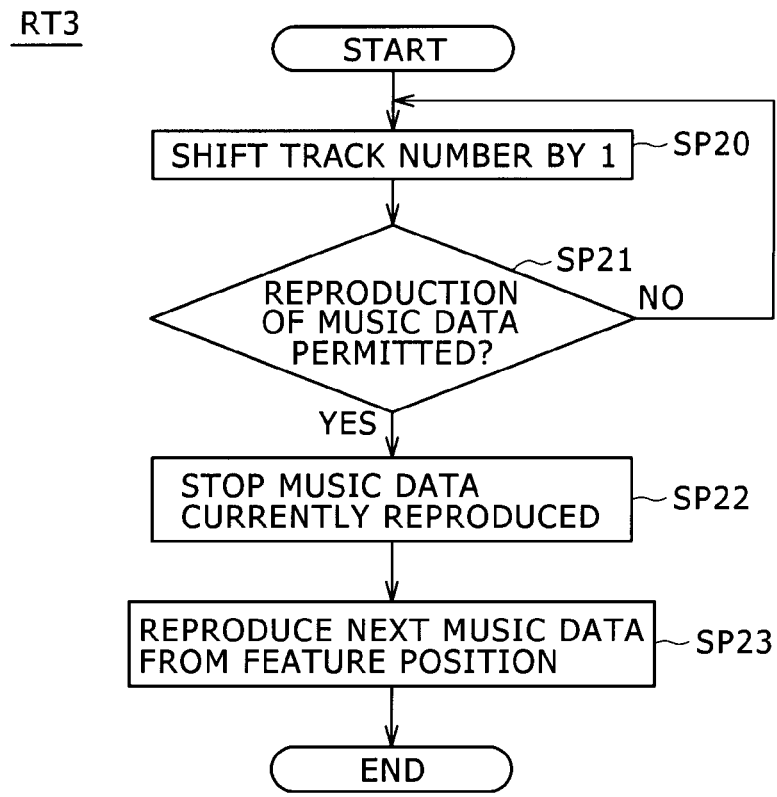
FIG. 12 is a flowchart indicative of a track switching procedure.

The following describes a music track switching procedure in the MusicStation function. As shown in FIG. 12, the control block 12 of the music reproducing apparatus 10 starts the MusicStation function and, upon recognition of a music track switching operation done through the left button B15 or the right button B16 of the remote controller RM1 while audio data Ad is being reproduced, starts music track switching procedure RT3, upon which the procedure goes to step SP20.

In step SP20, with reference to the track number of audio data information Ai corresponding to a track selected immediately before the track switching operation, when the left button B15 of the remote controller RM1 is pressed, the control block 12 decrements this track number by 1 within the channel play list PL allocated to the channel in selection to use the decremented number as a track number to be used after switching or, when the right button B16 is pressed, increments the track number by 1 within the channel play list PL allocated to the channel in selection to use the incremented number as a track number to be used after switching, upon which the procedure goes to step SP21.

It should be noted that the control block 12 is configured to control the switching of music track numbers in a circular manner by connecting the head of music track numbers with the tail thereof. Namely, while recognizing head music track number minus 1 as the tail music track number in step SP20, the control block 12 recognizes tail music track number plus 1 as the head music track number.

In step SP21, the control block 12 determines on the basis of audio data reproduction setting Adi of the audio data Ad corresponding to the music track number after switching whether the reproduction of the audio data Ad (or the specified audio data) to be specified by this audio data information Ai is permitted or not. If the determination is in the negative, it indicates that the reproduction of the specified audio data Ad is disabled, upon which the procedure returns to step SP20. In step SP20, the control block 12 further increments or decrements the music track number after switching obtained previously by 1 and uses the resultant number as a new music track number after switching.

On the other hand, if the determination is in the affirmative in step SP21, then the control block 12 recognizes that the reproduction of the specified audio data Ad is permitted, upon which the procedure to step SP22.

In step SP22, the control block 12 pauses the reproduction of the currently reproduced audio data Ad. In step SP23, the control block 12 displays, on the display block 13, the selection screen 20 showing attribute information Ti (jacket image, track title, and artist name) of the specified audio data Ad and starts the reproduction of the specified audio data Ad from a feature position (for example, a position indicated by one of three feature positional information Ct1 through Ct3), thereby ending this music track switching procedure RT3.

By this music track switching procedure, the music reproducing apparatus 10 switches between music tracks.

As described so far, the music reproducing apparatus 10 has the MusicStation function as one of functions of reproducing audio data Ad so as to provide the user with the music based on audio data Ad as if broadcast from a radio station.

(2-2) Related-Track Switching Function

In addition to the above-described basic functions, the music reproducing apparatus 10 provides a related-track switching function. In this related-track switching function, when a related-track switching block Bg4 of the remote controller RM1 is operated when at least one of the same-artist track icon A1, the same-age track icon A2, and the similar-track icon A3 is displayed on a GUI screen with the audio data associated with a track based on the audio data Ad being reproduced stored in the content storage block 15 while the MusicStation function is being executed, the track based on the audio data Ad being reproduced can be switched to a track related with this track without use of the channel play list PL (namely, the selected list PL) with which the audio data Ad being reproduced is registered.

Related-track switching buttons B18, B19, and B20 of the related-track switching block Bg4 of the remote controller RM1 correspond to the same-artist track icon A1, the same-age track icon A2, and the similar-track icon A3, respectively. The related-track switching button B18 corresponding to the same-artist track icon A1 is hereafter also referred to as the same-artist track switching button B18, the related-track switching button B19 corresponding to the same-age track icon A2 is hereafter also referred to as the same-age track switching button B19, and the related-track switching button B20 corresponding to the similar-track icon A3 is hereafter also referred to as the similar-track switching button B20.

Namely, when the same-artist track switching button B18 is pressed with at least the same-artist track icon A1 displayed, the music reproducing apparatus 10 switches a track based on the audio data Ad being reproduced to the audio data Ad corresponding to a track of the same artist as this track; when the same-age track switching button B19 is pressed with at least the same-age track icon A2 displayed, the music reproducing apparatus 10 switches a track based on the audio data Ad being reproduced to the audio data Ad corresponding to a track of the same age as this track; and when the similar-track switching button B20 is pressed with at least the similar-track icon A3 displayed, the music reproducing apparatus 10 switches a track based on the audio data Ad being reproduced to the audio data Ad corresponding to the similar track.

To be more specific, upon selection of a track in accordance with a channel switching operation or a track selection operation, the control block 12 of the music reproducing apparatus 10 starts the reproduction of the audio data Ad corresponding to the track being reproduced and, at the same time, determines whether the audio data Ad corresponding to the track of same artist based on the audio data Ad being reproduced, the audio data Ad corresponding to the track of same age based on the audio data Ad being reproduced, and the audio data Ad corresponding to the track similar to the track being reproduced are stored in the content storage block 15.

If the audio data Ad corresponding to the track of same artist based on the audio data Ad being reproduced is found stored in the content storage block 15, the control block 12 of the music reproducing apparatus 10 displays the same-artist track icon A1 on the GUI screen at this moment (the selection screen 20 or the reproducing screen 30). If the audio data Ad corresponding to the track of same age is found stored in the content storage block 15, the control block 12 displays the same-age track icon A2 on the GUI screen. If the audio data Ad corresponding to the similar track is found stored in the content storage block 15, the control block 12 displays the similar-track icon A3 on the GUI screen.

Consequently, the music reproducing apparatus 10 can notify the user whether the audio data Ad corresponding to the track of same artist, same age, or similar track based on the audio data Ad being reproduced is stored in the content storage block 15.

Further, recognizing the pressing of the same-artist track switching button B18 of the remote controller RM1 with the same-artist track icon A1 displayed, for example, the control block 12 of the music reproducing apparatus 10 actually searches the content storage block 15 for the audio data corresponding to a track of same artist based on the audio data Ad being reproduced and generates a play list containing the retrieved audio data Ad as a temporary channel play list PL (hereafter also referred to as a temporary related list). It should be noted that the audio data Ad being reproduced does not belong to this temporary related list PL.

Next, the control block 12 of the music reproducing apparatus 10 switches the channel play list PL to this temporary related list PL and uses this temporary related list PL and switches the audio data Ad being reproduced to one of the audio data Ad contained in this temporary list PL (for example, the first audio data Ad), thereby switching the track based on the audio data Ad being reproduced to a track of the same artist of this track. Subsequently, tracks of same artist are sequentially reproduced in accordance with this temporary related list PL.

Consequently, the music reproducing apparatus 10 can let the user hear music tracks related with the track based on the audio data Ad being reproduced by means of a simple operation.

It should be noted that, when a return button B21 of the remote controller RM1 is pressed, the control block 12 of the music reproducing apparatus 10 returns to the channel play list PL as it was before the switching to the related track (namely, the channel play list PL that was selected until the related track switching button of the remote controller RM1 was pressed) and reproduces the audio data Ad as it was before the switching, thereby deleting the temporary related list PL.

Figure 13:
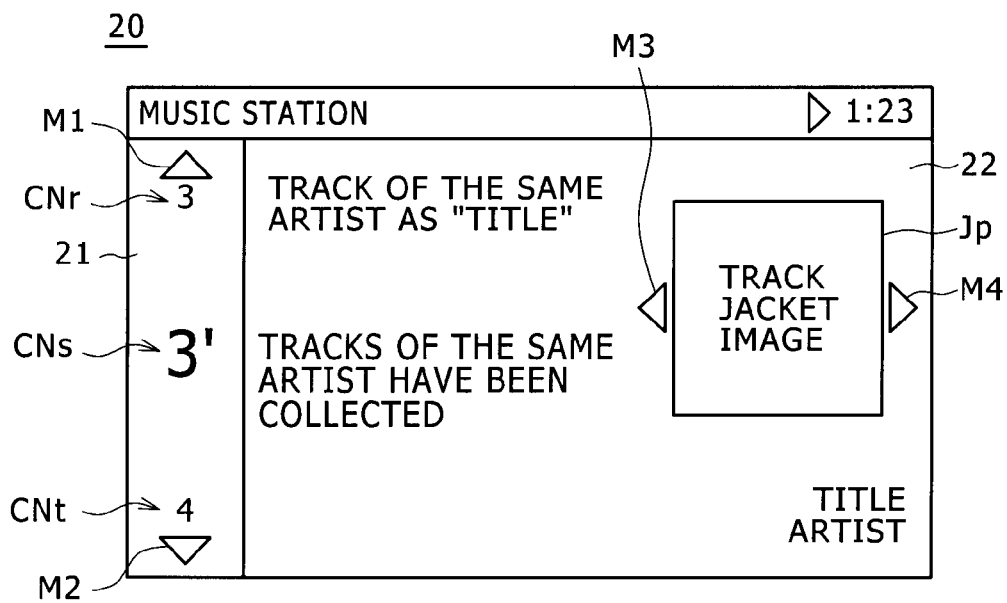
FIG. 13 shows a selection screen to be displayed after switching to a track of a same artist.

Now, referring to FIG. 13, there is shown the selection screen 20 that is displayed when the above-mentioned temporary related list PL is selected, the same parts as those in FIG. 6 being denoted by the same reference numerals. Because the temporary related list PL is handled as a channel play list PL in selection, the selection screen 20 in this case shows temporary channel number CNs ("3" for example) at the center of a channel selection area 21, channel number CNr ("3" for example" of the channel play list PL as it was before switching on top of the channel selection area 21, and channel number ("4" for example) subsequent to channel number CNr at the bottom of the channel selection area 21.

On the other hand, the left side of the track selection area 22 shows a list name (a track of the same artist as "Title" for example) of the temporary related list PL, list description ("Tracks of the same artist have been collected" for example), jacket image Jp corresponding to the selected track (namely, the track of the same artist as the track before switching), track title, and artist name.

Consequently, the music reproducing apparatus 10 can let the user easily recognize the contents of the selected track (namely, the track of the same artist as the track before switching).

Further, if a track switching operation is done through the left button B15 or the right button B16 of the remote controller RM1 with the above-described selection screen 20 displayed, the control block 12 of the music reproducing apparatus 10 switches between tracks on the basis of the temporary related list PL in the same manner as the selection of a normal channel play list PL.

Figure 14:
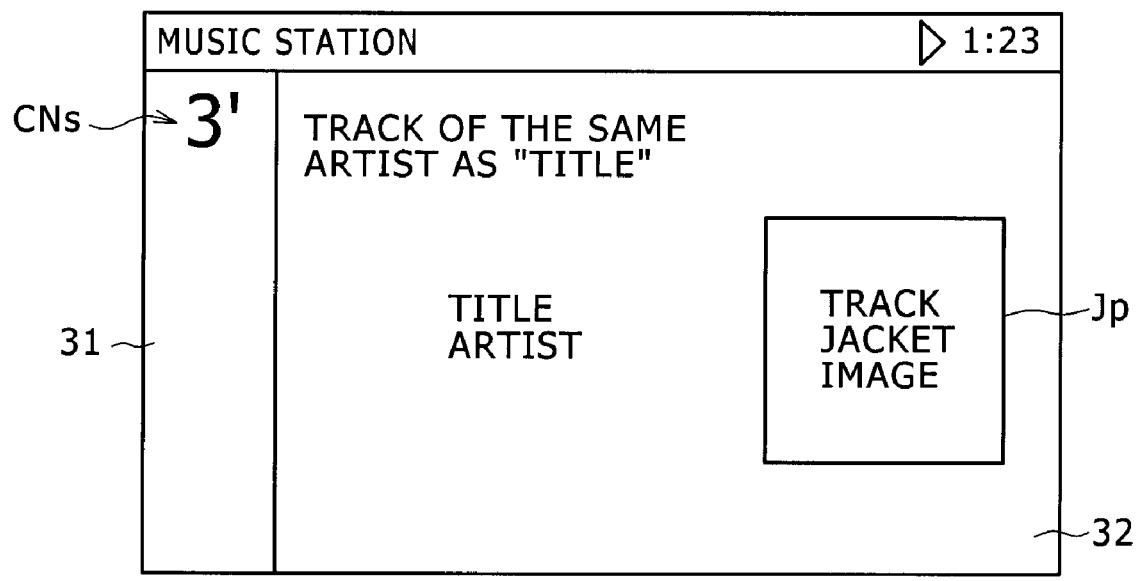
FIG. 14 is a reproducing screen to be displayed after switching to a track of a same artist.

Still further, if the enter button B17 of the remote controller RM1 is pressed with the selection screen 20 displayed or a predetermined period of time has passed without operating the remote controller RM1, then the control block 12 of the music reproducing apparatus 10 switches the GUI screen to the reproducing screen 30 shown in FIG. 14 with the same portions as those shown in FIG. 7 denoted by the same reference numerals.

Because the temporary related list PL is handled as the channel play list PL in selection, the reproducing screen 30 in this case shows only temporary channel number CNs ("3" for example") attached to the temporary related list PL in a selected channel display area 31 and the list name of the temporary related list PL, jacket image Jp of the selected track (namely, the track of the same artist as the track before switching), track name, and artist name in the left side of the selected track display area 32.

It should be noted that the switching between GUI screens to be executed when the temporary related list PL is selected and the accompanying control of reproduction of audio data Ad are substantially the same as the screen switching to be executed when a normal channel play list PL is selected and the accompanying control of reproduction of audio data Ad. Namely, if the temporary related list PL is selected, the control block 12 of the music reproducing apparatus 10 also shifts to the partial reproduction mode in which audio data Ad is reproduced from the feature position at the time when the selection screen 20 is switched and, at the time when the reproducing screen 30 is switched, the control block 12 shifts to the normal reproduction mode in which audio data Ad is normally reproduced.

Consequently, during the reproduction of any audio data Ad, by a simple operation of pressing any of the related track switching buttons B18, B19, and B20 of the remote controller RM1 corresponding to the related track notification icons A1, A2, and A3 displayed on GUI screen, this music reproducing apparatus 10 can switch a music track based on the audio data Ad being reproduced to a music track related thereto without use of a channel play list PL in which the audio data Ad being reproduced is registered.

(2-3) Related-Track Switching Procedure

Figure 15:
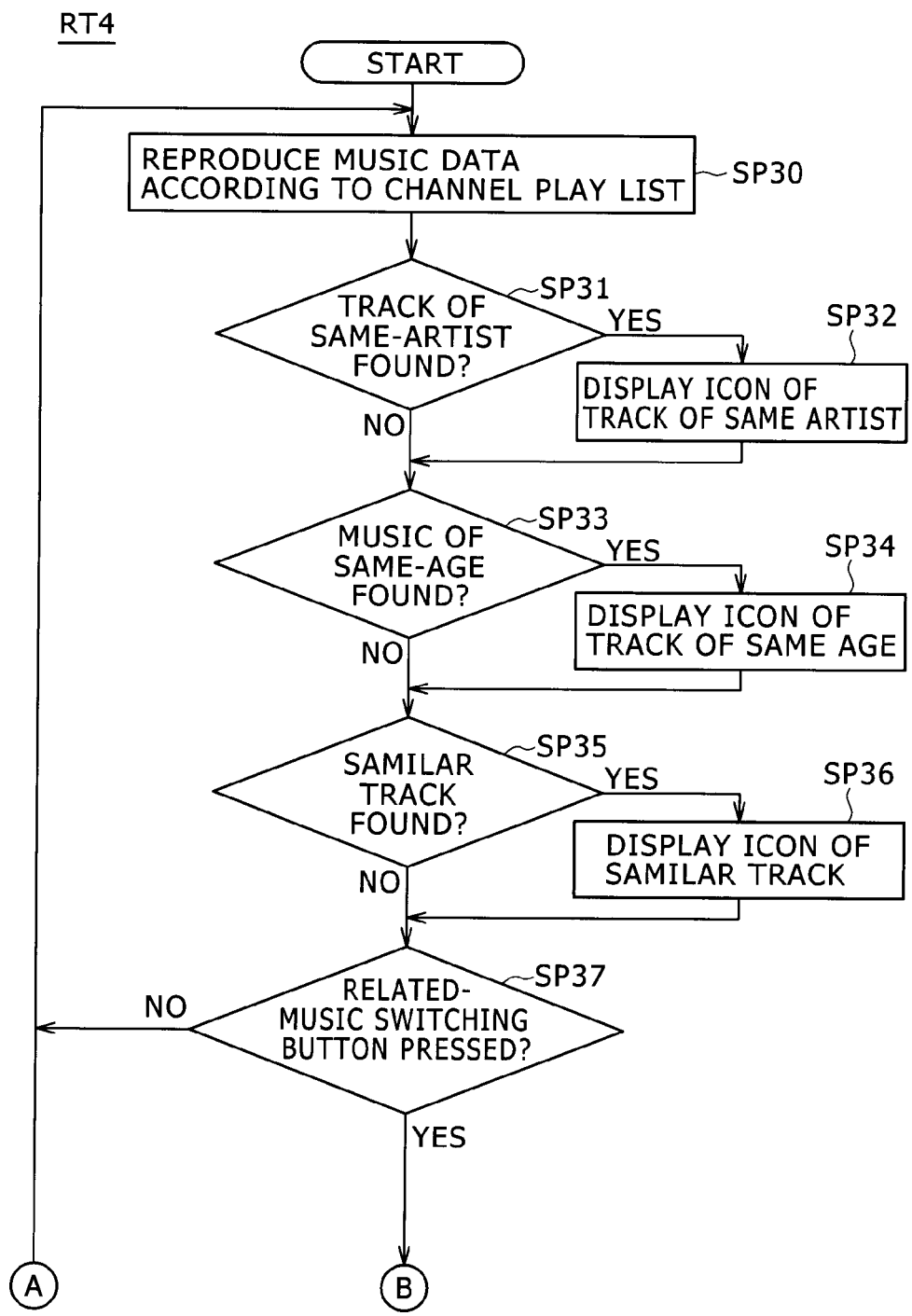
FIG. 15 is a flowchart indicative of a related-track switching procedure according to the first embodiment.
Figure 16:
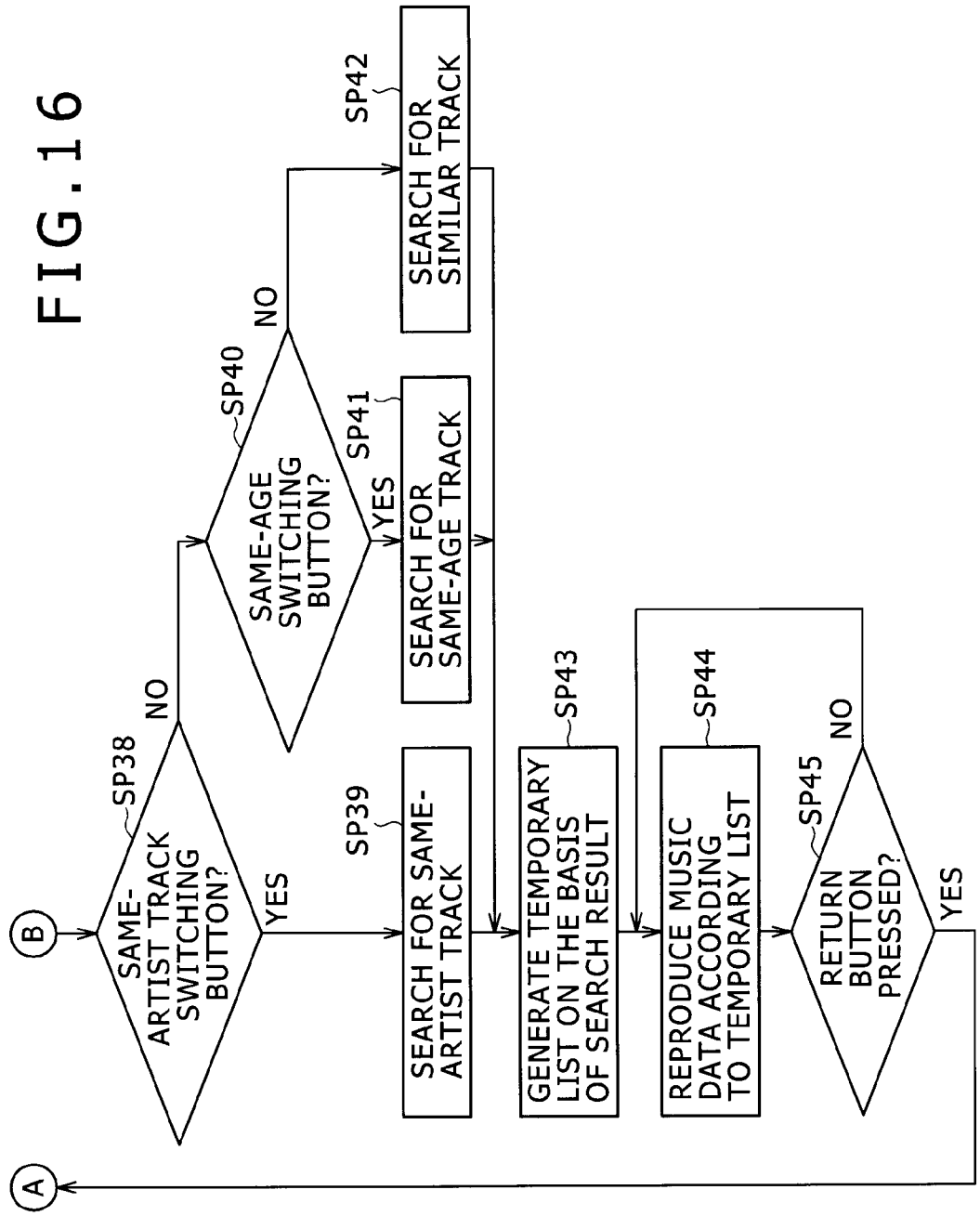
FIG. 16 is a flowchart continued from the flowchart shown in FIG. 15.

The following details a procedure of related-track switching with reference to the flowcharts shown in FIGS. 15 and 16. Starting up the MusicStation function, the control block 12 of the music reproducing apparatus 10 starts this related-track switching procedure RT4, upon which the procedure goes to step SP30.

In step SP30, the control block 12 selects a channel play list PL in response to a channel switching operation for example and starts the reproduction of one of the audio data Ad registered in the selected channel play list PL, upon which the procedure goes to step SP31.

In step SP31, the control block 12 determines whether the audio data Ad corresponding to a track of same artist as the audio data Ad being reproduced is stored in the content storage block 15.

If the determination is in the affirmative, it indicates that the audio data Ad has, in attribute information Ti thereof, a same artist name as that included in attribute information Ti of the audio data Ad being reproduced is stored in the content storage block 15. At this moment, the procedure goes to step SP32. In step SP32, the control block 12 displays the same-artist track icon A1 on GUI screen, upon which the procedure goes to SP33.

On the other hand, if the determination in step SP31 is in the negative, it indicates that the audio data Ad has, in attribute information Ti thereof, a same artist name as that included in attribute information Ti of the audio data Ad being reproduced is not stored in the content storage block 15. At this moment, the procedure goes to step SP33.

In step SP33, the control block 12 determines whether the audio data Ad corresponding to a track of same age as the track based on the audio data Ad being reproduced is stored in the content storage block 15.

Here, if the release year included in the attribute information Ti of the audio data Ad being reproduced is "1949", the control block 12 determines whether the audio data Ad corresponding to a track of same age as the track based on the audio data Ad being reproduced is stored in the content storage block 15 by recognizing the audio data Ad having attribute information Ti with release year being before "1949" to be the audio data Ad that corresponds to the track of the same age as the track based on the audio data Ad being reproduced.

Also, the control block 12 determines whether the audio data Ad corresponding to a track of same age is stored in the content storage block 15 by recognizing, if a release year included in the attribute information Ti of the audio data Ad being reproduced is between "1950" and "1959", the audio data Ad having attribute information Ti with the release year being between "1950" and "1959" to be the audio data that corresponds to the track of the same age as the track based on the audio data being reproduced; the control block 12 determines whether the audio data Ad corresponding to a track of same age is stored in the content storage block 15 by recognizing, if a release year included in the attribute information Ti of the audio data Ad being reproduced is between "1960" and "1969", the audio data Ad having attribute information Ti with the release year being between "1960" and "1969" to be the audio data that corresponds to the track of the same age as the track based on the audio data being reproduced; the control block 12 determines whether the audio data Ad corresponding to a track of same age is stored in the content storage block 15 by recognizing, if a release year included in the attribute information Ti of the audio data Ad being reproduced is between "1970" and "1979", the audio data Ad having attribute information Ti with the release year being between "1970" and "1979" to be the audio data that corresponds to the track of the same age as the track based on the audio data being reproduced; the control block 12 determines whether the audio data Ad corresponding to a track of same age is stored in the content storage block 15 by recognizing, if a release year included in the attribute information Ti of the audio data Ad being reproduced is between "1980" and "1989", the audio data Ad having attribute information Ti with the release year being between "1980" and "1989" to be the audio data that corresponds to the track of the same age as the track based on the audio data being reproduced; and the control block 12 determines whether the audio data Ad corresponding to a track of same age is stored in the content storage block 15 by recognizing, if a release year included in the attribute information Ti of the audio data Ad being reproduced is between "1990" and "1999", the audio data Ad having attribute information Ti with the release year being between "1990" and "1999" to be the audio data that corresponds to the track of the same age as the track based on the audio data being reproduced.

Further, if the release year included in the attribute information Ti of the audio data Ad being reproduced is between "2000" and "2019", the control block 12 recognizes the release year to be the same release year as that included in the attribute information Ti of the audio data Ad being reproduced or the audio data Ad having the attribute information Ti that is the release year immediately preceding or following that release year to be the audio data Ad that corresponds to the track of the same age as the track based on the music track Ad being reproduced, thereby determining whether the audio data Ad corresponding to the track of the same as is stored in the content storage block 15. Namely, in this case, if the release year included in the attribute information Ti of the audio data Ad being reproduced is "2005", for example, the control block 12 recognizes the audio data Ad having attribute information Ti of which release year is one of "2004", "2005" and "2006" to be the audio data Ad that corresponds to the track of the same age as the track based on the audio data Ad being reproduced.

Still further, if the release year included in the attribute information Ti of the audio data Ad being reproduced is "2020" or later, then the control block 12 recognizes the audio data Ad having the attribute information of which release year is "2020" or later to be the audio data Ad that corresponds to the track of the same age as the track based on the audio data being reproduced, thereby determining whether the audio data corresponding to the track of the same age is stored in the content storage block 15.

Thus, the control block 12 determines whether the audio data Ad corresponding to the track of the same age as the track based on the audio data Ad being reproduced is stored in the content storage block 15.

If the determination of step SP33 is in the affirmative, it indicates that the audio data Ad corresponding to the track of the same age as the track based on the music track Ad being reproduced is stored in the content storage block 15. Then, the procedure goes to step SP34. In step SP34, the control block 12 displays the same-age track icon A2, upon which the procedure goes to step SP35.

On the other hand, if the determination in step SP33 is in the negative, it indicates that the audio data Ad corresponding to the same age as the track based on the audio data Ad being reproduced is not stored in the content storage block 15, upon which the procedure goes to step SP35.

In step SP35, the control block 12 determines whether the audio data Ad corresponding to a track similar to the track based on the audio data Ad being reproduced is stored in the content storage block 15.

If the determination in step SP35 is in the affirmative, it indicates that the audio data Ad having a same cluster number in the attribute information Ti as a cluster number included in the attribute information Ti of the audio data Ad being reproduced is stored in the content storage block 15, upon which the procedure goes to step SP36. In step SP36, the control block 12 displays the similar-track icon A3, upon which the procedure goes to step SP37.

On the other hand, if the determination in step SP35 is in the negative, it indicates that the audio data Ad having a same cluster number in the attribute information Ti as a cluster number included in the attribute information Ti of the audio data Ad being reproduced is not stored in the content storage block 15, upon which the procedure goes to step SP37.

In step SP37, the control block 12 determines which of the same-artist track switching button B18, the same-age track switching button B19, and the similar-track switching button B20 that are related-track switching buttons of the remote controller RM1 has been pressed. If the determination in step SP37 is in the negative, it indicates that the user still wants to hear the track based on the audio data Ad being reproduced. At this moment, the procedure returns to step SP30 again to continue the reproduction of the audio data Ad based on the channel play list PL.

On the other hand, if the determination in step SP37 is in the affirmative, the procedure goes to step SP38. In step SP38, the control block 12 first determines whether the pressed related-track switching button is the same-artist track switching button B18. If the determination in step SP38 is in the affirmative, then the control block 12 recognizes that the same-artist track switching button B18 has been pressed, upon which the procedure goes to step SP39. It is assumed here that the same-artist track switching button B18 has been pressed with the same-artist track icon A1 displayed on the GUI screen.

In step SP39, the control block 12 searches the content storage block 15 for the audio data Ad corresponding to the track of the same artist as the track based on the audio data Ad being reproduced, upon which the procedure goes to step SP43.

On the other hand, if the determination in step SP38 is in the negative, it indicates that the pressed related-track switching button is not the same-artist track switching button B18, upon which the procedure goes to step SP40.

In step SP40, the control block 12 determines whether the pressed related-track switching button is the same-age track switching button B19. If the determination in step SP40 is in the affirmative, the control block 12 recognizes that the same-artist track switching button B18 has been pressed, upon which the procedure goes to step SP41. It is assumed here that the same-age track switching button B19 has been pressed with the same-age track icon A2 displayed on the GUI screen.

In step SP41, the control block 12 searches the content storage block 15 for the audio data Ad corresponding to the track of the same age as the track based on the audio data Ad being reproduced, upon which the procedure goes to step SP43.

On the other hand, if the determination in step SP40 is in the negative, it indicates that the pressed related-track switching button is neither the same-artist track switching button B18 nor the same-age track switching button B19 but the similar-track switching button B20. The control block 12 recognizes that the similar-track switching button B20 has been pressed, upon which the procedure goes to step SP42. It is assumed here that the similar-track switching button B20 has been pressed with the similar-track icon A3 displayed on the GUI screen.

In step SP42, the control block 12 searches the content storage block 15 for the audio data Ad corresponding to the similar track based on the audio data Ad being reproduced, upon which the procedure goes to step SP43.

In step SP43, the control block 12 generates a temporary related list PL made up of the audio data Ad retrieved in step SP39, SP41, or SP42 and temporarily stores the generated list PL into the list storage block 17, upon which the procedure goes to step SP44. It should be noted that this temporary related list PL is generated such that the sequence of tracks becomes random every time.

In step SP44, the control block 12 switches the channel play list PL to this temporary related list PL and selects this list and stops the audio data Ad being reproduced, thereby starting the reproduction of one of the audio data Ad belonging to this temporary related list PL (namely, the audio data Ad corresponding to the track related with the track based on the audio data Ad reproduced so far), upon which the procedure goes to step SP45.

In step SP45, the control block 12 determines whether the return button B21 of the remote controller RM1 has been pressed. If the determination in step SP45 is in the negative, then the procedure returns to step SP44 to continue the reproduction of the audio data Ad based on the temporary related list PL.

On the other hand, if the determination in step SP45 is in the affirmative, then the procedure returns to step SP30 to reproduce the last audio data Ad (namely, the audio data Ad corresponding to the track as it was before the switching to the related track) by returning to the channel play list PL as it was before the switching to the related track, upon which the control block 12 deletes the temporary related list PL from the list storage block 17.

Following the above-described related-track switching procedure RT4, the control block 12 of the music reproducing apparatus 10 switches the track based on the audio data Ad being reproduced to the track related with this track.

It is assumed in this related-track switching procedure RT4 that the related-track switching buttons (namely, the same-artist track switching button B18, the same-age track switching button B19, and the similar-track switching button B20) have been pressed with the corresponding icons (namely, the same-artist track icon A1, same-age track icon A2, and the similar-track icon A3) displayed in step SP39, step SP41, and SP42, respectively. However, if the a related-track switching button is pressed with no corresponding related-track notification icon displayed, such as the pressing of the same-artist track switching button B18 with the same-artist track icon A1 not displayed, for example, text information indicative that the audio data Ad corresponding to a track switchable by a related-track switching button is not stored in the content storage block 15, for example, may be displayed on the GUI screen, upon which the procedure returns to step SP30 to continue the reproduction of the audio data Ad based on the channel play list PL.

(2-4) Operation and Effects of the First Embodiment

Configured as such, the music reproducing apparatus 10 stores audio data Ad and attribute information Ti thereof into the content storage block 15 by relating the audio data Ad and the attribute information Ti each other.

Starting the reproduction of any audio data Ad stored in the content storage block 15, the control block 12 of the music reproducing apparatus 10 checks on the basis of the attribute information Ti of the audio data Ad being reproduced and the attribute information Ti of other audio data Ad if the audio data Ad of a track related with a track based on the audio data Ad being reproduced is stored in the content storage block 15.

If the audio data Ad of the related track is found stored in the content storage block 15, then the control block 12 of the music reproducing apparatus 10 displays the related-track notification icon thereof (the same-artist track icon A1, the same-age track icon A2, or the similar-track icon A3) on the GUI screen.

Consequently, the music reproducing apparatus 10 can notify the user of the storage, in the content storage block 15, of the audio data Ad of each track related with the track based on the audio data Ad being reproduced.

Further, recognizing that the related-track switching button of the remote controller RM1 (namely, the same-artist track switching button B18, the same-age track switching button B19, or the similar-track switching button B20) with a related-track notification icon displayed, the control block 12 of the music reproducing apparatus 10 actually searches the content storage block 15 for the audio data Ad of the track based on the audio data Ad being reproduced and generates a temporary channel play list (or a temporary related list) PL made up of the retrieved audio data Ad, thereby switching the audio data Ad to be reproduced to one of the audio data Ad belonging to the generated temporary related list PL.

Thus, during the reproduction of audio data Ad, the music reproducing apparatus 10 can switch the audio data to be reproduced to the audio data Ad belonging to the temporary related list PL to which the audio data Ad of a track related with the track based on the audio data Ad being reproduced, namely, one of the audio data Ad of a track related with the track based on the audio data AD being reproduced.

Further, when the return button B21 of the remote controller RM1 is pressed during the reproduction of audio data Ad registered in this temporary related list PL, the control block 12 of the music reproducing apparatus 10 returns the reproduction of the audio data Ad as it was before the switching to the related track and, at the same time, deletes the temporary related list PL.

Thus, the music reproducing apparatus 10 generates each temporary related list PL every time the switching to the audio data Ad of each related track is requested, stores the generated temporary related list PL on a temporary basis, and deletes stored temporary related list PL every time the reproduction of this audio data Ad has ended. This novel configuration eliminates the necessity of generating a channel play list PL made up of the audio data Ad of related tracks beforehand and storing the generated channel play list PL for each of the audio data Ad stored in the content storage block 15, thereby enhancing the effective use of the list storage block 17.

According to the above-described novel configuration, the music reproducing apparatus 10 can only let the user press a related-track switching button of the remote controller RM1 during the reproduction of any audio data Ad to switch the reproduction of audio data Ad from the audio data Ad being reproduced to the audio data Ad that belongs to a channel play list to which the content related with this audio data Ad belongs, thereby significantly enhancing the convenience involved at the time of content reproduction.

(3) A Second Embodiment

The following describes a second embodiment of the present invention. The second embodiment executes related-track switching that is different from the above-described first embodiment. It should be noted that, generally, the second embodiment is substantially the same with the first embodiment in the configuration of a music reproducing apparatus 10 and the basic functions of a MusicStation function.

To be more specific, a difference of the second embodiment from the first embodiment lies in that, after switching the reproduction of audio data Ad from the audio data Ad being reproduced to the audio data of a track related with the music track based on this audio data Ad, if the audio data Ad of the track related with the track based on the audio data Ad after switching is stored in the content storage block 15, the music reproducing apparatus 10 displays an related-track notification icon (the same-artist track icon A1, the same-age track icon A2, or the similar-track icon A3) and, when a related-track switching button of the remote controller RM1 (the same-artist track switching button B18, the same-age track switching button B19, or the similar-track switching button B20) is pressed, makes switching from this audio data Ad after switching to the audio data Ad of a track related with the track based on this music track Ad.

Namely, in the second embodiment, related tracks can be sequentially traced, from a track being reproduced to a track related therewith, to a track related therewith, and so on.

(3-1) A Related-Track Switching Processing According to the Second Embodiment

Figure 17:
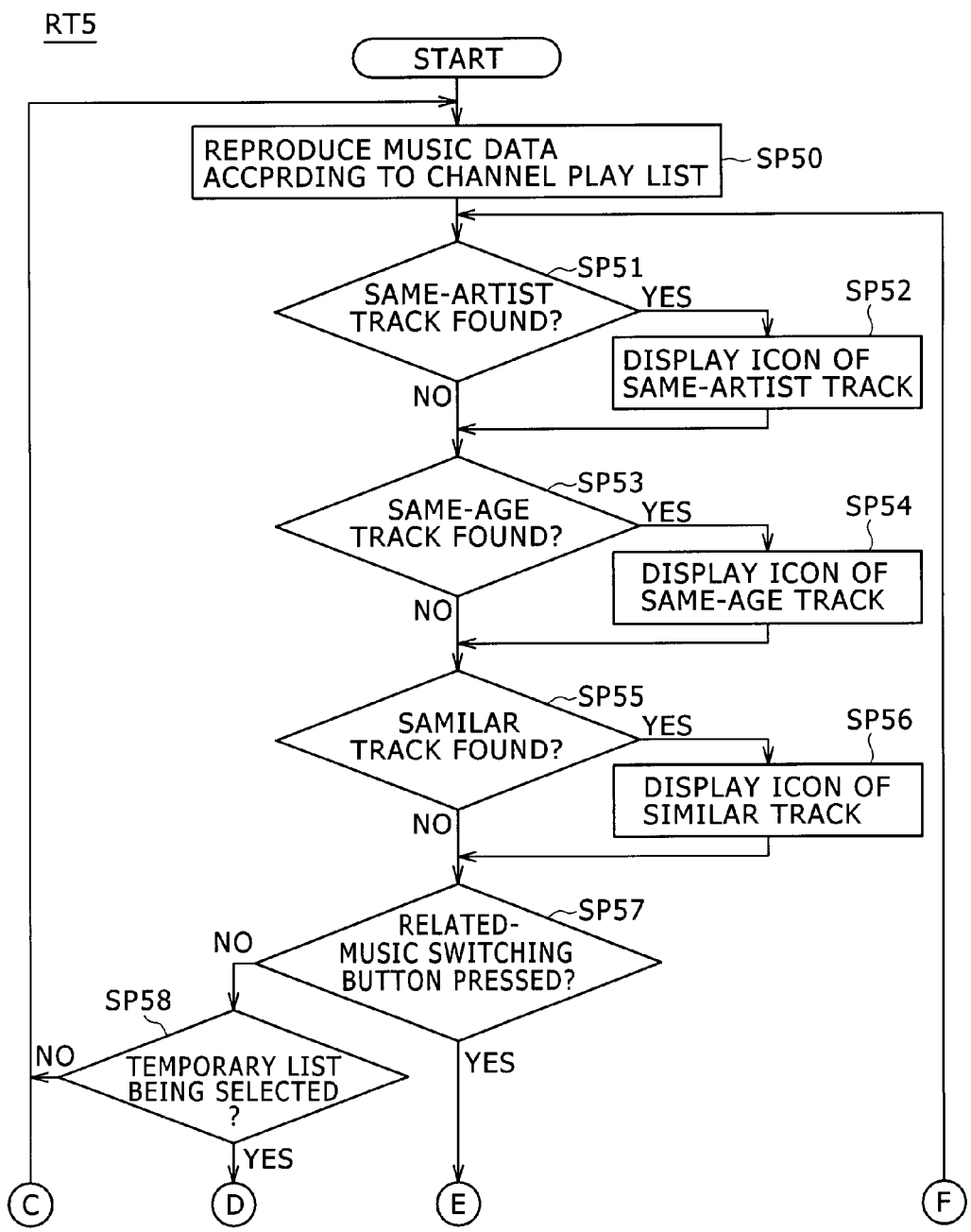
FIG. 17 is a flowchart indicative of a related-track switching procedure according to a second embodiment.
Figure 18:
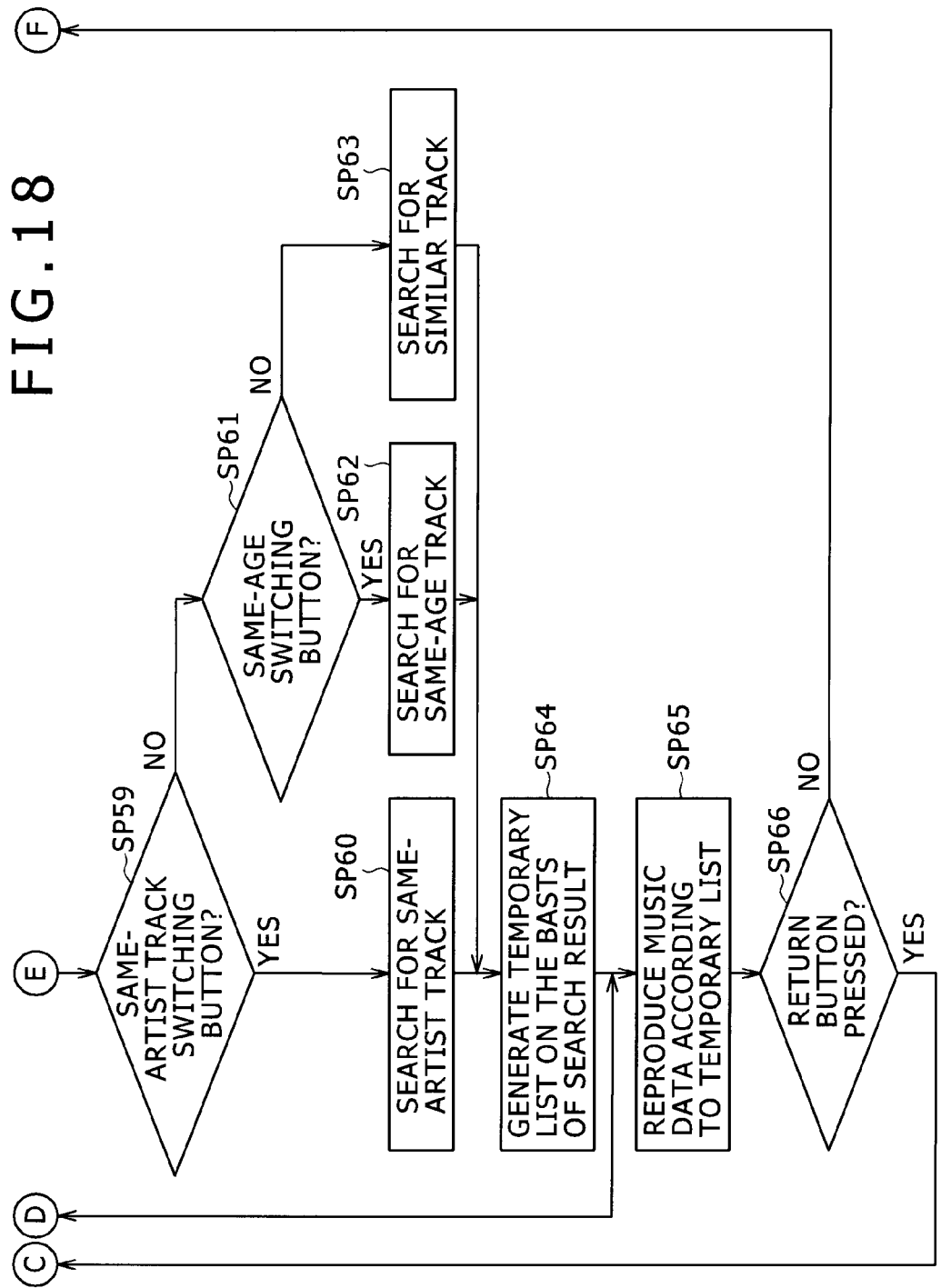
FIG. 18 is a flowchart continued from the flowchart shown in FIG. 17.

The following details a related-track switching processing according to the second embodiment with reference to the flowcharts shown in FIGS. 17 and 18. Starting up the MusicStation function, the control block 12 of the music reproducing apparatus 10 starts this related-track switching procedure RT5, upon which the procedure goes to step SP50.

In step SP50, the control block 12 selects a channel play list PL in response to a channel selecting operation for example and starts the reproduction of one of the audio data Ad registered in the selected channel play list PL, upon which the procedure goes to step SP51.

In step SP51, the control block 12 first determines whether the audio data corresponding to a track of a same artist as the track based on the audio data Ad being reproduced is stored in the content storage block 15.

If the determination in step SP51 is in the affirmative, it indicates that the audio data Ad having in the attribute information Ti thereof a same artist name as an artist name included in the attribute information Ti of the audio data Ad being reproduced is stored in the content storage block 15, upon which the procedure goes to step SP52. In step SP52, the control block 12 displays the same-artist track icon A1 on the GUI screen, upon which the procedure goes to step SP53.

On the other hand, if the determination in step SP51 is in the negative, it indicates that the audio data Ad having in the attribute information Ti thereof a same artist name as an artist name included in the attribute information Ti of the audio data Ad being reproduced is not stored in the content storage block 15, upon which the procedure goes to step SP53.

In step SP53, the control block 12 determines whether the audio data Ad corresponding to a track of a same age as the track based on the audio data Ad being reproduced is stored in the content storage block 15. It should be noted that this determination is made on the basis of the release year included in the attribute information Ti as with the first embodiment.

If the determination in step SP53 is in the affirmative, it indicates that the audio data Ad corresponding to the track of the same age as the track based on the audio data Ad being reproduced is stored in the content storage block 15, upon which the procedure goes to step SP54. In step SP54, the control block 12 displays the same-age track icon A2 on the GUI screen, upon which the procedure goes to step SP55.

On the other hand, if the determination in step SP53 is in the negative, it indicates that the audio data Ad corresponding to the track of the same age as the track based on the audio data Ad being reproduced is not stored in the content storage block 15, upon which the procedure goes to step SP55.

In step SP55, the control block 12 determines whether the audio data Ad corresponding to a track similar to the track based on the audio data Ad being reproduced is stored in the content storage block 15.

If the determination in step SP55 is in the affirmative, it indicates that the audio data having, in the attribute information Ti thereof, a same cluster number as a cluster number included in the attribute information Ti of the audio data being reproduced is stored in the content storage block 15, upon which the procedure goes to step SP56. In step SP56, the control block 12 displays the similar-track icon A3 on the GUI screen, upon which the procedure goes to step SP57.

On the other hand, if the determination in step SP55 is in the negative, it indicates that the audio data having, in the attribute information Ti thereof, a same cluster number as a cluster number included in the attribute information Ti of the audio data being reproduced is not stored in the content storage block 15, upon which the procedure goes to step SP57.

In step SP57, the control block 12 determines whether any one of the related-track switching buttons of the remote controller RM1, namely, the same-artist track switching button B18, same-age track switching button B19, and the similar-track switching button B20, has been pressed. If the determination in this step S57 is in the negative, the procedure goes to step SP58, in which the control block 12 determines whether the currently selected channel play list PL is a temporary related list PL.

It should be noted that, at this point of time, no temporary related list PL has been generated; because the currently selected channel play list PL is a normal channel play list PL prepared in the list storage block 17, the determination in step SP58 is in the negative again, upon which the procedure returns to step SP50 to continue the reproduction of the audio data Ad based on the channel play list PL.

On the other hand, if the determination in step SP57 is in the affirmative, the procedure goes to step SP59. In step SP59, the control block 12 first determines whether the pressed related-track switching button is the same-artist track switching button B18. If the determination in step SP59 is in the affirmative, the control block 12 recognizes that the same-artist track switching button B18 has been pressed, upon which the procedure goes to step SP60. It is assumed here that the same-artist track switching button B18 has been pressed with the same-artist track icon A1 displayed on the GUI screen.

In step SP60, the control block 12 searches the content storage block 15 for the audio data Ad corresponding to a track of the same artist as the track based on the audio data Ad being reproduced, upon which the procedure goes to step SP64.

On the other hand, if the determination in step SP59 is in the negative, it indicates that the pressed related-track switching button is not the same-artist track switching button B18, upon which the procedure goes to step SP61.

In step SP61, the control block 12 determines whether the pressed related-track button is the same-age track switching button B19. If the determination in step SP61 is in the affirmative, the control block 12 recognizes that the same-artist track switching button B18 has been pressed, upon which the procedure goes to step SP62. It is assumed here that the same-age track switching button B19 has been pressed with the same-age track icon A2 displayed on the GUI screen.

In step SP62, the control block 12 searches the content storage block 15 for the audio data Ad corresponding to a track of a same age as the track based on the audio data Ad being reproduced, upon which the procedure goes to step SP64.

On the other hand, if the determination in step SP61 is in the negative, it indicates that the pressed related-track switching button is neither the same-artist track switching button B18 or the same-age track switching button B19 but the similar-track switching button B20. The control block 12 recognizes that the similar-track switching button B20 has been pressed, upon which the procedure goes to step SP63. It is assumed here that the similar-track switching button B20 has been pressed with the similar-track icon A3 displayed on the GUI screen.

In step SP63, the control block 12 searches the content storage block 15 for the audio data Ad corresponding to a track similar to the track based on the audio data Ad being reproduced, upon which the procedure goes to step SP64.

In step SP64, the control block 12 generates a temporary related list PL made up of the audio data Ad retrieved in step SP60, SP62, or SP63 and stores the generated list in the list storage block 17, upon which the procedure goes to step SP65. It should be noted that this temporary related list PL is generated such that the sequence of tracks becomes random.

In step SP65, the control block 12 switches the channel play list PL to this temporary related list PL and selects this list and the switches the reproduction of audio data Ad to one of the audio data Ad belonging to the temporary related list PL (namely, the audio data Ad corresponding to a track related with the track based on the audio data Ad reproduced so far), upon which the procedure goes to step SP66.

In step SP66, the control block 12 determines whether the return button B21 of the remote controller RM1 has been pressed. If the determination in step SP66 is in the negative, the procedure returns to step SP51.

Figure 19:
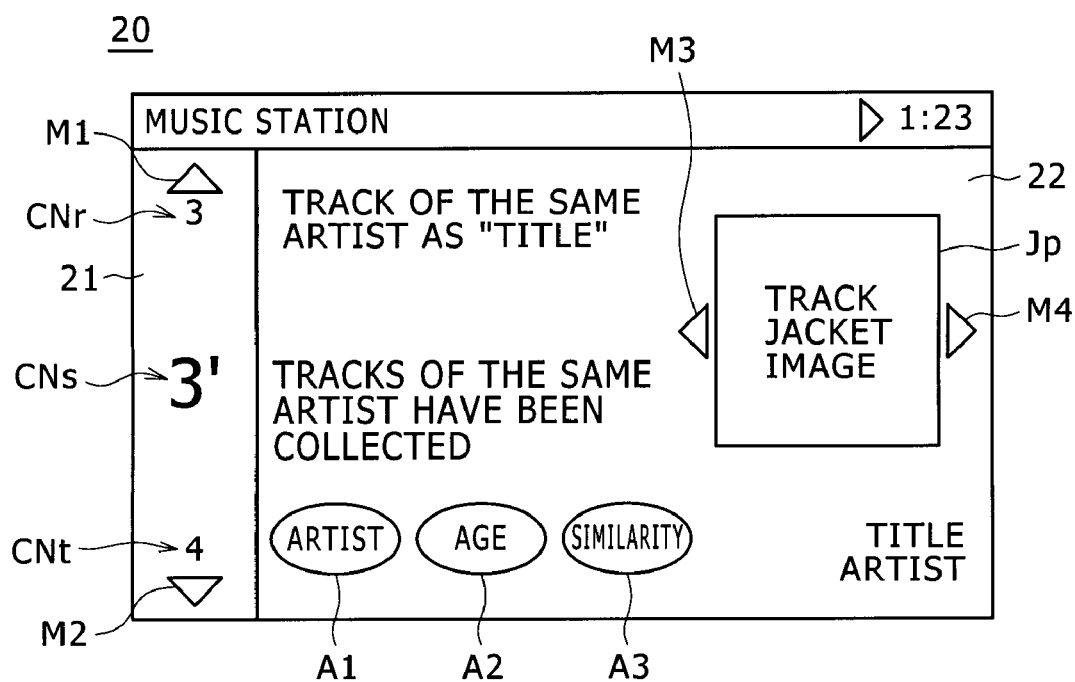
FIG. 19 shows a selection screen to be displayed after switching to a track of a same artist according to the second embodiment.

Then, this time, the control block 12 executes the processing of steps SP51 through SP56 on the audio data Ad being reproduced on the basis of the temporary related list PL (namely, the audio data after switching) to determine whether the audio data Ad of a track related with the track based on this audio data Ad is stored in the content storage block 15. In accordance with a result of the determination, the control block 12 displays a related-track notification icon (the same-artist track icon A1, the same-age track icon A2, or the similar-track icon A3) on the GUI screen (the selection screen 20 for example) on which the temporary related list PL is selected as shown in FIG. 19.

Thus, the second embodiment is configured to notify the user of a related track by displaying a related-track notification icon for the audio data Ad being reproduced on the basis of a temporary related list PL depending on whether the audio data Ad of the related track is stored in the content storage block 15.

Now, when a related-track switching button of the remote controller RM1 is pressed, it indicates that the determination of step SP57 is in the affirmative and the control block 12 executes the processing of steps SP59 through SP65. The control block 12 generates a new temporary related list PL made up of the audio data Ad of a track related with the track based on the audio data being reproduced on the basis of a temporary related list PL and selects the newly generated temporary related list PL. At the same time, the control block 12 switches the reproduction of audio data Ad to one of the audio data Ad belonging to the newly generated temporary related list PL and deletes the previous temporary related list PL, upon which the procedure goes to step SP66.

In step SP66, the control block 12 repeats the execution of the processing of steps SP51 through SP65 until the determination in step SP66 is in the affirmative, namely, the return button B21 of the remote controller RM1 is pressed. Every time a related-track switching button is pressed, the control block 12 generates a new temporary related list PL and switches the audio data Ad to be reproduced to the audio data Ad belonging to the newly generated temporary related list PL, thereby switching between the tracks to be reproduced, from the track being reproduced to a track related thereto, and so on.

When the return button B21 is pressed, the procedure returns to the SP50, in which the control block 12 returns to the channel play list PL selected before the switching to a related track and reproduces the audio data Ad of the previous track and deletes the temporary related list PL from the list storage block 17.

It should be noted that, if the determination in step SP58 is in the affirmative, it indicates that the user wants to hear the track based on the audio data Ad being reproduced, upon which the procedure goes to step SP65 to continue the reproduction of the audio data Ad based on the temporary related list PL.

(3-2) Operation and Effects of the Second Embodiment

In the above-described configuration, starting the reproduction of any of the audio data Ad stored in the content storage block 15, the music reproducing apparatus 10, if the audio data Ad of a track related with the track based on this audio data being reproduced is stored in the content storage block 15, displays a related-track notification icon indicative thereof (the same-artist track icon A1, same-age track icon A2, or the similar-track icon A3) on the GUI screen.

When a related-track switching button of the remote controller RM1 (the same-artist track switching button B18, the same-age track switching button B19, or the similar-track switching button B20) is pressed with a related-track notification icon displayed on the GUI screen, the control block 12 of the music reproducing apparatus 10 generates a temporary channel play list PL (a temporary related list) made up of the audio data Ad of a track related with the track based on the audio data Ad being reproduced and then switches the audio data Ad to be reproduced to one of the audio data Ad belonging to this generated temporary related list PL.

At the same time, if the audio data Ad of the track related with the track based on the audio data Ad being reproduced (namely, the audio data Ad after switching) is found stored in the content storage block 15 on the basis of the temporary related list PL, the control block 12 of the music reproducing apparatus 10 displays an related-track notification icon (the same-artist track icon A1, the same-age track icon A2, or the similar-track icon A3) on the GUI screen.

As described above, also for the audio data Ad being reproduced, the music reproducing apparatus 10 displays, on the basis of the temporary related list PL, a related-track notification icon depending on whether the audio data Ad of the related track is stored in the content storage block 15, thereby notifying the user of any related track.

Further, when a related-track switching button of the remote controller RM1 is pressed at this moment, the control block 12 of the music reproducing apparatus 10 generates, on basis of a temporary related list PL, a new temporary related list PL made up of the audio data Ad of a track related with the track based on the audio data Ad being reproduced and then stores the generated new temporary related list PL in the list storage block 17 (or writing the new temporary related list PL over the old temporary related list PL), thereby switching the audio data Ad to be reproduced to one of the audio data Ad belonging to the newly generated temporary related list PL.

Next, until the return button B21 of the remote controller RM1 is pressed, generates a new temporary related list PL every time a related-track switching button is pressed and, at the same time, deletes the old temporary related list PL, thereby switching to the audio data Ad to be reproduced to one of the audio data Ad belonging to the newly generated temporary related list PL.

Thus, only with a simple operation of repeatedly pressing the related-track switching button, the music reproducing apparatus 10 can switch the track to be reproduced, from the track being reproduced to a track related thereto, and so on.

Also, only with a simple operation of pressing the return button B21 of the remote controller RM1, the control block 12 of the music reproducing apparatus 10 can return to the first channel play list PL as it was before the switching of related tracks to return to the reproduction of the previous audio data Ad.

According to the above-described configuration, only simply repeatedly pressing the related-track switching button, the music reproducing apparatus 10 according to the second embodiment can switch the track being reproduced to another related thereto, still another related thereto, and so on, thereby enhancing the convenience at the time of content reproduction.

(4) A Third Embodiment

Figure 20:
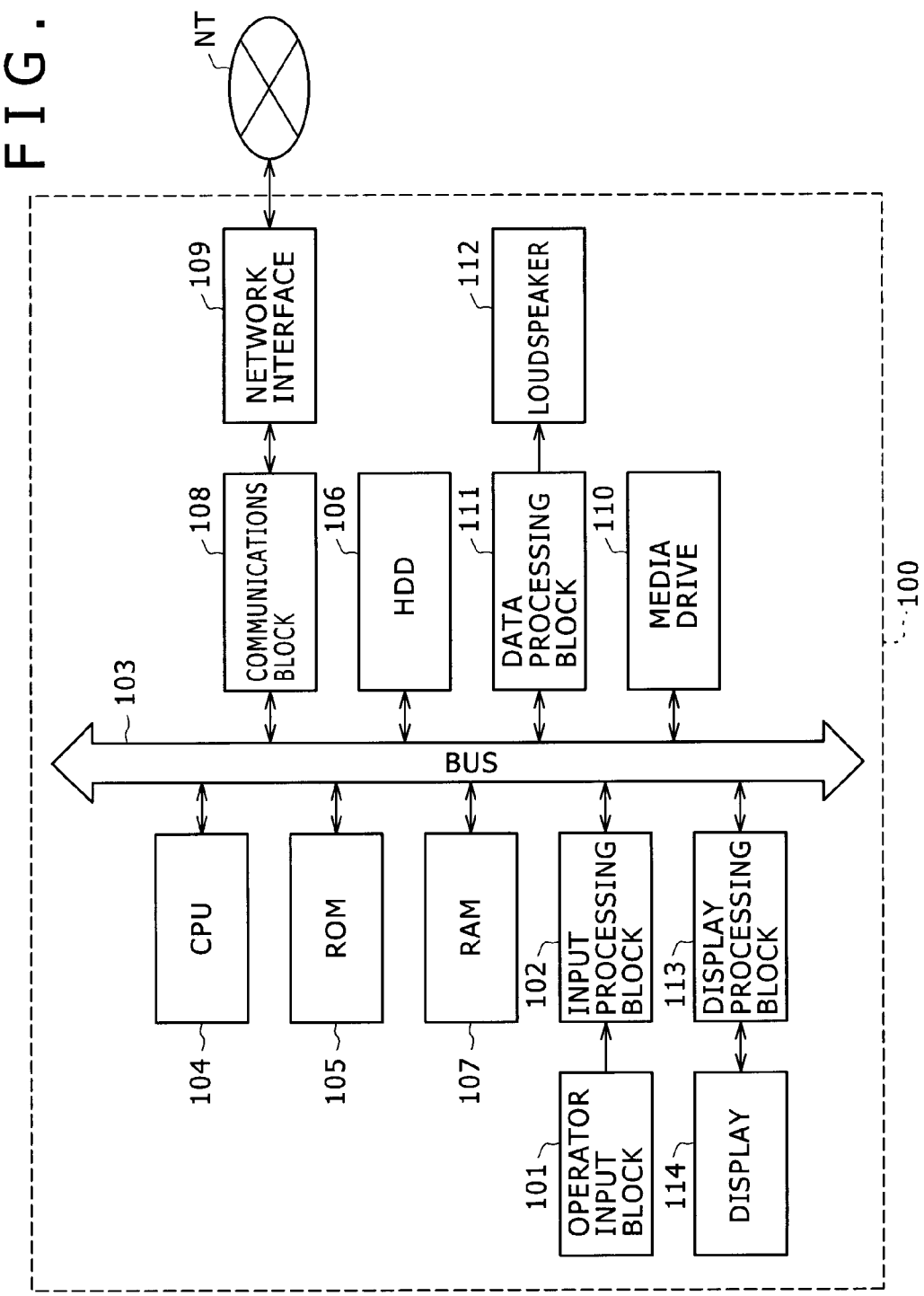
FIG. 20 is block diagram illustrating a configuration of a reproducing apparatus according to a third embodiment.

The following describes a third embodiment of the present invention. A reproducing apparatus 100 shown in FIG. 20 is an example that is realized by configuring, by a hardware approach, the reproducing apparatus 1 (FIG. 1) having the above-described functional block configuration. When an operator input block 101 made up of various control buttons arranged on a surface of the housing of the reproducing apparatus 100 or on a remote controller (not shown) is operated by a user, the operator input block 101 recognizes the entered operation and outputs a operation input signal corresponding to the recognized input operation to an input processing block 102. The input processing block 102 executes predetermined processing on the received operation input signal to provide an operation command, which is then transmitted to a CPU (Central Processing Unit) 104 over a bus 103.

The CPU 104 loads various programs, such as an operating program and application programs, from a ROM (Read Only Memory) 105 or a hard disk drive 106 via the bus 103 into a RAM (Random Access Memory) 107. Then, the CPU 104 controls the reproducing apparatus in its entirety as instructed by these programs developed in the RAM 107 as well as executing predetermined computational processing and various processing operations in accordance with operations commands entered through the input processing block 102.

For example, the CPU 104 accesses a music providing server, not shown, on a network NT via a communications processing block 108 and a network interface 109 in this order.

When an operation input signal is entered through the operator input block 101 by the user for requesting the downloading of particular audio data, the CPU 104 accordingly requests the music providing server for downloading the specified audio data. Consequently, the CPU 104 sequentially downloads the request audio data from the music providing server via the network interface 109 and the communications processing block 108 in this order. Then, the CPU 104 stores the downloaded audio data into the hard disk drive 106.

When an operation input signal for recording audio data from a recording media, such as a CD, is entered through the operator input block 101 by the user, the CPU 104 reads the audio data from the recording media loaded on a media drive 110 and transmits the read audio data to a data processing circuit 111. The data processing circuit 111 compresses the received audio data and stores the compressed audio data in the hard disk drive 106.

Further, a particular audio data stored in the hard disk drive 106 is specified by the user through the operator input block 101 and an operation input signal for requesting the reproduction of this audio data is entered by the user, the CPU 104 reads the specified audio data from the hard disk drive 106 and transmits the read audio data to the data processing circuit 111. The data processing circuit 111 decompresses the audio data and then executes equalizing, digital-to-analog conversion, and amplification on the decompressed audio data, transmitting the processed audio data to a loudspeaker 112. Consequently, music (or a music track) is sounded from the loudspeaker 112.

The hard disk drive 106 also stores a plurality of play lists. When a particular play list is specified and an operation input signal is entered for requesting the reproduction of audio data in accordance with the specified play list by the user through the operator input block 101, the CPU 104 reads the specified play list from the hard disk drive 106.

Then, the CPU 104 reads the specified audio data registered in this play list from the hard disk drive 106 in a sequence specified in the play list and transmits the play list to the data processing circuit 111. The data processing circuit 111 decompresses the audio data and executes equalizing, digital-to-analog conversion, and amplification on the decompressed audio data, transmitting the processed audio data to a loudspeaker 112. Consequently, music (or a music track) is sounded from the loudspeaker 112 in the sequence specified in the play list.

Further, the CPU 104 generates display data corresponding to the results of the execution of various programs (downloading, recording, and reproducing of audio data, for example) and transmits the generated display data to a display processing block 113. The display processing block 113 shows a screen based on the display data onto a display 114.

It should be noted that, because the reproducing apparatus 100 is configured to execute, through the CPU 104, various processing operations as instructed by various programs stored in the ROM 105 or the hard disk drive 106, the reproducing apparatus 100 can function the hard disk drive 106 in substantially the same manner as the content storage block 2 of the reproducing apparatus 1, can function the operator input block 101 and the input processing block 102 in substantially the same manner as the input block 3, can function the media drive 510, the data processing circuit 511, and the loudspeaker 512 in substantially the same manner as the reproducing block 4, and can function the CPU 104 in substantially the same manner as the control block 5 of the reproducing apparatus 1 by appropriately selecting programs to be stored in the ROM 105 or the hard disk drive 106 in accordance with various functions (namely, processing operations to be executed) of the reproducing apparatus 1 (FIG. 1) having the above-described functional block configuration.

Therefore, the reproducing apparatus 100 can realize each function of the reproducing apparatus 1 by means of the hardware configuration of the reproducing apparatus 100 itself, thereby providing substantially the same effects as those provided by the above-described first and second embodiments of the invention.

It should be noted that, in this third embodiment, the CPU 104 executes various processing operations on the basis of various functions of the reproducing apparatus 1 in accordance with various programs stored in the ROM 105 or the hard disk drive 106 in advance; however, it is also practicable, for example, to record various programs to recording media, such as CD and DVD (Digital Versatile Disc), and read these programs from the recording media by the CPU 104 to execute various functions of the reproducing apparatus 1 or install these programs into the hard disk drive 106 for the execution.

(5) Other Embodiments

In the above-mentioned first and second embodiments, the remote controller RM1 and the receiving block 11 are used for input blocks; however, it is also practicable, for example, to arrange various controls having substantially the same functions as those of the controls arranged on the remote controller RM1 onto the housing of the music reproducing apparatus 10, thereby providing the input block.

In the above-mentioned first and second embodiments, when the related-track switching button of the remote controller RM1 is pressed with any audio data Ad being reproduced and the related-track notification icon displayed, a channel play list (or a temporary related list) PL as the related list information made up of the audio data Ad of a track related with a track based on the audio data Ad being reproduced is generated; however, it is also practicable to generate a temporary related list PL made up of the audio data Ad of a track related with a track based on any audio data Ad to be reproduced when the reproduction of this audio data Ad starts and temporarily store the generated temporary related list PL into the list storage block 17, deleting this temporary related list PL when the reproduction of this audio data Ad has been completed.

The above-mentioned new configuration can shorten the time from the pressing of the related-track switching button of the remote controller RM1 to the switching to the related track.

Further, in the above-mentioned first and second embodiments, a temporary related list PL made up of the audio data Ad of a related track is generated when a request comes for switching to the audio data Ad of a related track and the generated list is temporarily stored in the list storage block 17; however, it is also practicable to generate a channel play list PL made up of the audio data Ad of a track related to a track based on the audio data Ad that is newly stored in the content storage block 15 when this audio data is newly stored in the list storage block 17 and store the generated channel play list PL in the list storage block 17, for example, thereby storing beforehand the temporary related list PL made up of the audio data Ad of related tracks into the list storage block 17.

Still further, in the above-mentioned first and second embodiments, the temporary related list PL is deleted from the list storage block 17 when the return button B21 of the remote controller RM1 is pressed during the reproduction of audio data in accordance with the temporary related list PL; however, it is also practicable to keep any temporary related list PL, once generated, stored in the list storage block 17, for example.

This novel configuration allows, when the same temporary related list PL becomes necessary, to reuse the that temporary related list PL stored in the list storage block 17, thereby shortening the time required for switching to a related track.

In the above-mentioned first and second embodiments, when the return button B21 of the remote controller RM1 is pressed during the reproduction of audio data on the basis of a temporary related list PL (namely, during the reproduction of the audio data Ad of a related track), the temporary related list PL is deleted and the channel play list PL used before the switching to a related track is resumed again; however, it is also practicable, for example, to delete the temporary related list PL and return to the previous channel play list PL when the up button B13 of the remote controller RM1 is pressed, when same related-track switching button (the same-artist track switching button B18, the same-age track switching button B19, or the similar-track switching button B20) as the related-track switching button pressed for related-track switching (the same-artist track switching button B18, the same-age track switching button B19, or the similar-track switching button B20) is pressed, or when the reproduction of all audio data Ad belonging to the temporary related list PL has been completed.

If the previous channel play list PL has been resumed as described above, it is also practicable to reproduce the audio data Ad that immediately follows the audio data Ad of the track that was being reproduced before switching.

Further, in the above-mentioned first and second embodiments, a temporary related list PL made up of the audio data Ad of each related track is generated by determining whether the track is related to a track based on the audio data Ad being reproduced on the basis of the artist name, release year, and cluster number in attribute information Ti, for example; however, it is also practicable to determine whether a track is related with a track based on the audio data Ad being reproduced on the basis of the track title, genre, tempo, and mood in attribute information Ti, for example.

To be more specific, on the basis of a track title in attribute information Ti, the audio data Ad of a track similar in title to the track based on the audio data Ad being reproduced may be handled as the audio data Ad of a related track; on the basis of genre in attribute information Ti, the audio data Ad of a track similar in genre to the track based on the audio data Ad being reproduced may be handled as the audio data Ad of a related track; on the basis of tempo in attribute information Ti, the audio data Ad of a track similar in tempo to the track based on the audio data Ad being reproduced may be handled as the audio data Ad of a related track; and on the basis of mood in attribute information Ti, the audio data Ad of a track similar in mood to the track based on the audio data Ad being reproduced may be handled as the audio data Ad of a related track, for example.

Further, in the above-mentioned first and second embodiments, the ID, artist name, album name, genre, release year, feature data (tempo, vocal, mood, etc.), and cluster number of each music track are used as attribute information Ti of audio data Ad; however, it is also practicable to use various other kinds of information, such as the hometown and age of each artist, for attribute information Ti. In the above-mentioned embodiments, the feature data and cluster number included in the attribute information Ti are obtained from the outside; however, it is also practicable for the music reproducing apparatus 10 to generate these feature data and cluster number by frequency-analyzing and clustering audio data Ad.

In the above-mentioned first and second embodiments, the release years in attribute information Ti before "1949", between "1950" and "1959", "1960" and "1969", "1970" and "1979", "1980" and "11989", "1990" and "1999", and after "2020" are handled as of the same age and the release years between "2000" and "2019" and one year before and one year after these years are handled as of the same age; however, it is also practicable to handle a release year and several years before and after the release year as of the same age no matter when the release year is or it is also practicable determine the same age on the basis of any other classifications.

In the above-mentioned first and second embodiments, a GUI screen is switched from the reproducing screen 30 to the selection screen 20 when a channel switching operation or a track switching operation is executed with the reproducing screen 30 displayed; however, it is also practicable to switch a GUI screen from the reproducing screen 30 to the selection screen 20 only when a channel switching operation is executed with the reproducing screen 30 displayed and, when a track switching operation is executed, it is practicable to keep the reproducing screen 30 unswitched but switch between track titles, artist names, and jacket images Jp on the reproducing screen 30 and display a related-track notification icon again.

In the above-mentioned first and second embodiments, if the audio data Ad of a track related with a track based on the audio data Ad being reproduced is found stored in the content storage block 15 on the basis of a temporary related list PL, a related track notification icon (the same-artist track icon A1, the same-age track icon A2, or the similar-track icon A3) indicative thereof is displayed on GUI screen; however, it is also practicable, for example, if audio data Ad is being reproduced on the basis of a temporary list PL made up of the audio data Ad of a track of a same artist upon pressing of the same-artist track switching button B18 of the remote controller RM1, not to display the same-artist track icon A1. This holds true also with the same-age track icon A2 and the similar-track icon A3.

The above-mentioned configuration allows the user to execute track switching from tracks of a same artist to tracks of same age to similar tracks, for example, not the track switching only between tracks of a same artist, for example, thereby enhancing the convenience at the time of related-track switching.

Further, in the above-mentioned first, second, and third embodiments, the audio data of music tracks is used as content; however, it is also practicable to use various other kinds of data, such as audio data of other than music tracks, video data, and program data, for example. The present invention is widely applicable to personal computers, mobile phones, PDAs (Personal Digital Assistance), portable audio players, audio components, DVD recorders, hard disk recorders, and other various content-handling devices as the reproducing apparatus 1, the music reproducing apparatus 10, and the reproducing apparatus 100.

The present invention is widely applicable to content reproducing apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus comprising:
   a central processing unit (CPU);
   a content storage block configured to store content and attribute information thereof in correspondence with one another in a computer readable storage medium;
   an input block configured to receive a content switching command that switches the content and corresponds to a particular attribute;
   a reproducing block configured to reproduce content; and
   a control block executed by the CPU and configured to, upon receiving the content switching command from the input block during reproduction of the first piece of content by said reproducing block, control said reproducing block to switch from a first piece of content to a second piece of content that shares the particular attribute with said first piece of content, said second piece of content being selected on the basis of attribute information of said first piece of content; and
   wherein when the reproducing block switches from the first piece of content to the second piece of content that shares the particular attribute with said first piece of content, the second piece of content is reproduced starting at a feature position of the second piece of content instead of at a beginning of the second piece of content.

2. The reproducing apparatus according to claim 1, further comprising:
   a display configured to output information, wherein
   in response to said reproducing block starting to reproduce said first piece of content, said control block searches said computer readable storage medium for any piece of content related to said first piece of content and, in response to at least one piece of content being found, outputting a notification on said display.

3. The reproducing apparatus according to claim 1, wherein, when a content switching command is entered from said input block, said control block searches said computer readable storage medium for a piece of content related to said first piece of content on the basis of said attribute information of said first piece of content and generates a related list on the basis of a result of the search.

4. The reproducing apparatus according to claim 3, wherein said related list is generated on the basis of at least one of a content artist name, a content age, and a content feature included in said attribute information.

5. The reproducing apparatus according to claim 1, wherein, when a content switching command is received from said input block while the second piece of content belonging to a related list is being reproduced by said reproducing block, said control block controls said reproducing block such that said content being reproduced is switched to said first piece of content again and said first piece of content is reproduced.

6. The reproducing apparatus according to claim 1, wherein, when a content switching command is further received from said input block while the second piece of content is being reproduced by said reproducing block, said control block controls said reproducing block to switch to a third piece of content belonging to a related list and to reproduce said third piece of content.

7. The reproducing apparatus according to claim 1, wherein, when a content switching command is further received via said input block while the second piece of content is being reproduced by said reproducing block, said control block controls said reproducing block to switch to a third piece of content included in a related list which includes at least one piece of content having attributes corresponding to said second piece of content being reproduced, said third piece of content being selected on the basis of attribute information of said second piece of content being reproduced.

8. The reproducing apparatus according to claim 1, further comprising:
   a list storage block configured to store a related list, wherein said related list information is generated on the basis of a result of a search, and stored into said list storage block, said search includes searching said computer readable storage medium for any piece of content related to said first piece of content and is performed in response to said reproducing block starting to reproduce said first piece of content.

9. The reproducing apparatus according to claim 8, further comprising:
   a list storage block configured to store said related list, wherein, when said reproducing block ends at least one of a reproduction of a piece of content belonging to said related list information and a reproduction of said first piece of content, said reproducing block deletes said related list from said list storage block.

10. A reproducing method comprising the steps of;
    reproducing a piece of content;
    receiving a content switching command that switches the content and corresponds to a particular attribute; and
    switching from the piece of content to a second piece of content that shares the particular attribute with said piece of content upon receiving the content switching command during reproduction of the piece of content, said second piece of content being selected on the basis of attribute information of said piece of content; and
    wherein when the reproducing block switches from the first piece of content to the second piece of content that shares the particular attribute with said first piece of content, the second piece of content is reproduced starting at a feature position of the second piece of content instead of at a beginning of the second piece of content.

11. The reproducing method according to claim 10, further comprising the step of:
    displaying, in response to said reproducing step starting to reproduce said first piece of content, information indicative of a result of a search onto a display, said search including searching a computer readable storage medium for any piece of content related to said first piece of content.

12. The reproducing method according to claim 10, further comprising the step of:
    generating a related list on the basis of a result of a search, the search including searching a computer readable medium for any piece of content related to said first piece of content on the basis of attribute information of said first piece of content in response to a content switching command being received from an input block.

13. The reproducing method according to claim 12, wherein said related list is generated on the basis of at least one of a content artist name, a content age, and a content feature included in said attribute information.

14. The reproducing method according to claim 10, wherein, when a content switching command is further received from an input block while said second piece of content belonging to a related list is being reproduced in said reproducing step, said switching step switches to said first piece of content again and reproduces said first piece of content.

15. The reproducing method according to claim 10, wherein when a content switching command is still further received from an input block while the second piece of content is being reproduced in said reproducing step, said switching step switches to a third piece of content belonging to a related list to which said second piece of content belongs and reproduces said third piece of content.

16. The reproducing method according to claim 10, wherein, when a content switching command is received via an input block while the second piece of content is being reproduced in said reproducing step, said switching step switches to a third piece of content belonging to a related list which includes at least one piece of content having attributes corresponding to said second piece of content being reproduced, said third piece of content being selected on the basis of attribute information of said second piece of content being reproduced.

17. The reproducing method according to claim 10, further comprising the step of:
 searching a computer readable medium for any piece of content related to said first piece of content in response to said reproducing step starting to reproduce said first piece of content;
 generating a related list on the basis of a result of the search;
 storing the generated related list into a list storage block.

18. The reproducing method according to claim 17 further comprising the step of:
 deleting the related list from a list storage in response to said reproducing step ending at least one of a reproduction of a piece of content belonging to said related list and reproduction of said first piece of content.

19. A non-transitory computer readable medium having stored thereon a reproducing program that when executed by a computer causes the computer to execute the steps of:
 reproducing a piece of content;
 receiving a content switching command that switches the content and corresponds to a particular attribute; and
 switching from the piece of content to a second piece of content that shares the particular attribute with said piece of content upon receiving the content switching command during reproduction of the piece of content, said second piece of content being selected on the basis of attribute information of said first piece of content; and
 wherein when the reproducing block switches from the first piece of content to the second piece of content that shares the particular attribute with said first piece of content, the second piece of content is reproduced starting at a feature position of the second piece of content instead of at a beginning of the second piece of content.

20. The non-transitory computer readable medium according to claim 19, further comprising the step of:
 displaying, in response to said reproducing step starting to reproduce said first piece of content, information indicative of a result of a search onto a display, said search including searching a computer readable storage medium for any piece of content related to said first piece of content.

21. The non-transitory computer readable medium according to claim 19, still further comprising the step of:
 generating a related list on the basis of a result of a search, the search including searching a computer readable medium for any piece of content related to said first piece of content on the basis of attribute information of said first piece of content in response to a content switching command being received from an input block.

22. The non-transitory computer readable medium according to claim 19, wherein said related list is generated on the basis of at least one of a content artist name, a content age, and a content feature included in said attribute information.

23. The non-transitory computer readable medium according to claim 19, wherein, when a content switching command is further received from an input block while said second piece of content belonging to a related list is being reproduced in said reproducing step, said switching step switches to said first piece of content again and reproduces said first piece of content.

24. The non-transitory computer readable medium according to claim 19, wherein when a content switching command is still further received from an input block while the second piece of content is being reproduced in said reproducing step, said switching step switches to a third piece of content belonging to a related list to which said second piece of content belongs and reproduces said third piece of content.

25. The non-transitory computer readable medium according to claim 19, wherein, when a content switching command is received via an input block while the second piece of content is being reproduced in said reproducing step, said switching step switches to a third piece of content belonging to a related list which includes at least one piece of content having attributes corresponding to said second piece of content being reproduced, said third piece of content being selected on the basis of attribute information of said second piece of content being reproduced.

26. The non-transitory computer readable medium according to claim 19, further comprising the step of:
 searching a computer readable medium for any piece of content related to said first piece of content in response to said reproducing step starting to reproduce said first piece of content;
 generating a related list on the basis of a result of the search;
 storing the generated related list into a list storage block.

27. The non-transitory computer readable medium according to claim 26 further comprising the step of:
 deleting the related list from a list storage in response to said reproducing step ending at least one of a reproduction of a piece of content belonging to said related list and reproduction of said first piece of content.

28. A reproducing apparatus comprising:
 content storage means for storing content and attribute information thereof in correspondence with one another;
 input means for receiving a content switching command that switches the content and corresponds to a particular attribute;
 reproducing means for reproducing content; and
 control means for controlling said reproducing means to, upon receiving the content switching command from the input block during reproduction of the first piece of content by said reproducing block, switch from a first piece of content to a second piece of content that shares the particular attribute with said first piece of content, said second piece of content being selected on the basis of attribute information of said first piece of content; and
 wherein when the reproducing block switches from the first piece of content to the second piece of content that shares the particular attribute with said first piece of content, the second piece of content is reproduced starting at a feature position of the second piece of content instead of at a beginning of the second piece of content.

* * * * *